United States Patent
Ettes et al.

(10) Patent No.: US 10,193,393 B2
(45) Date of Patent: Jan. 29, 2019

(54) WIRELESS INDUCTIVE POWER TRANSFER

(71) Applicant: KONINKLIJKE PHILIPS N.V., Eindhoven (NL)

(72) Inventors: Wilhelmus Gerardus Maria Ettes, Leeuwarden (NL); Antonius Adriaan Maria Staring, Eindhoven (NL); Klaas Jacob Lulofs, Eindhoven (NL); Eddy Gerrit Veltman, Steenbergen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 125 days.

(21) Appl. No.: 15/506,119

(22) PCT Filed: Sep. 11, 2015

(86) PCT No.: PCT/EP2015/070890
§ 371 (c)(1),
(2) Date: Feb. 23, 2017

(87) PCT Pub. No.: WO2016/041880
PCT Pub. Date: Mar. 24, 2016

(65) Prior Publication Data
US 2018/0219419 A1    Aug. 2, 2018

(30) Foreign Application Priority Data
Sep. 16, 2014  (EP) .................................. 14184960

(51) Int. Cl.
*H01F 27/42*     (2006.01)
*H01F 37/00*     (2006.01)
(Continued)

(52) U.S. Cl.
CPC .............. *H02J 50/12* (2016.02); *H02J 5/005* (2013.01); *H02J 7/025* (2013.01);
(Continued)

(58) Field of Classification Search
CPC .. H02J 50/12; H02J 50/80; H02J 50/90; H02J 5/005; H02J 7/025; H02M 3/3376; H04B 5/0037; H04B 5/0093
(Continued)

(56) References Cited

U.S. PATENT DOCUMENTS

| 2008/0197713 A1* | 8/2008 | Jin .......................... H02J 5/005 307/104 |
| 2012/0235636 A1 | 9/2012 | Partovi |
| 2014/0254696 A1 | 9/2014 | Norconk et al. |

OTHER PUBLICATIONS

Wireless Power Consortium, Downloaded on Mar. 18, 2014, 2 Pages.
System Description, Wireless Power Transfer, vol. I: Low Power, Part 1: Interface Definition, Version 1.0 Jul. 2010, 84 Pages.

* cited by examiner

Primary Examiner — Carlos Amaya

(57) ABSTRACT

A wireless power transfer system includes a power receiver and a power transmitter providing power to this using an inductive power signal. The power transmitter comprises a variable resonance circuit (201) having a variable resonance frequency and generating the inductive power signal. A driver (203) generates the drive signal and a load modulation receiver (303) demodulates load modulation of the inductive power signal. An adaptor (305) adapts the operating frequency and the resonance frequency to converge, and specifically is arranged to control the operating frequency and the resonance frequency to be substantially the same. The adaptation of the operating frequency and the resonance frequency is further in response to a demodulation quality measure. The invention may allow improved communication, and in particular may reduce intermodulation distortion.

18 Claims, 25 Drawing Sheets

(51) Int. Cl.
*H01F 38/00* (2006.01)
*H02J 50/12* (2016.01)
*H02M 3/337* (2006.01)
*H04B 5/00* (2006.01)
*H02J 5/00* (2016.01)
*H02J 7/02* (2016.01)

(52) U.S. Cl.
CPC ........ *H02M 3/3376* (2013.01); *H04B 5/0037* (2013.01); *H04B 5/0093* (2013.01)

(58) Field of Classification Search
USPC .......................................................... 307/104
See application file for complete search history.

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2015/070890, filed on Sep. 11, 2015, which claims the benefit of European Patent Application No. 14184960.4, filed on Sep. 16, 2014. These applications are hereby incorporated by reference herein.

FIELD OF THE INVENTION

The invention relates to inductive power transfer and in particular, but not exclusively, to a power transmitter providing inductive power transfer using elements compatible with the Qi Specifications.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries, and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Many wireless power transmission systems, such as e.g. Qi, supports communication from the power receiver to the power transmitter thereby enabling the power receiver to provide information that may allow the power transmitter to adapt to the specific power receiver.

In many systems, such communication is by load modulation of the power transfer signal. Specifically, the communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage.

More information of the application of load modulation in Qi can e.g. be found in chapter 6 of part 1 of the Qi wireless power specification (version 1.0).

For load modulation, the power transfer signal generated from the transmitter inductor is accordingly used as a carrier signal for the load modulation introduced by the changes of the loading of the power transfer signal at the power receiver. In order to provide improved power transfer performance, it is of course necessary for the communication reliability to be as high as possible, and specifically for the bit or message error rate to be minimized. However, the load modulation performance depends on many different operating characteristics and parameters, including for example the frequency of the power transfer signal, the specific load values for different loads of the load modulation etc.

Accordingly, it can often be difficult to achieve optimal communication performance in a power transfer system using load modulation. This aspect is particularly critical as the performance is often a trade-off between communication performance and other operating characteristics and performance. For example, there is often a contradiction between the desires of optimal power transfer performance and of optimal communication performance. Such issues are often particularly critical for lower values of the coupling between the inductors of the power receiver and the power transmitter, and thus is particularly critical for applications wherein the distance between these may be increased.

An improved power transfer approach would accordingly be advantageous. In particular, an approach that allows improved operation, improved power transfer, increased flexibility, facilitated implementation, facilitated operation, improved communication, reduced communication errors, improved power control and/or improved performance would be advantageous. Especially, in many scenarios, it would be advantageous to improve communication at decreased coupling factors, such as e.g. occurs for increasing distances between the power receiver and power transmitter coils.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver using an inductive power signal; the power transmitter comprising: a variable resonance circuit for generating the inductive power signal in response to a drive signal, the variable resonance circuit having a resonance frequency being a variable resonance frequency; a driver for generating the drive signal for the variable resonance circuit, the drive signal having an operating frequency; a load modulation receiver for demodulating load modulation of the inductive power signal by the power receiver and for generating a demodulation quality measure; and an adaptor for adapting the operating frequency and the resonance frequency to converge, the adaptation of the operating frequency and the resonance frequency further being in response to the demodulation quality measure.

The invention may provide improved performance in many wireless power transfer systems and may in particular provide improved communication by load modulation. In many embodiments, improved power transfer, and especially improved power transfer efficiency, can be achieved while still providing reliable communication based on load modulation of the power signal.

The Inventors have specifically realized that intermodulation distortion can degrade load modulation communication but can be effectively mitigated by controlling and linking the resonance frequency of a power transmitter and the operating frequency of the drive signal. They have further realized that this may however in some scenarios degrade other communication parameters, such as modulation depth. The Inventors have further realized that this may be mitigated by an adaptation of the operating frequency and primary resonance frequency which both seeks to converge the frequencies and takes into account the demodulation quality measure.

The invention may e.g. provide reduced intermodulation distortion while ensuring that any degradation to other communication characteristics is maintained within acceptable limits.

The adaptor may converge the operating frequency and the resonance frequency by a target or steady state frequency being the same for the operating frequency and the resonance frequency. In some embodiments, the adaptation to converge the operating frequency and the resonance frequency may comprise or consist in maintaining a (e.g. required minimum) convergence of the operating frequency and the resonance frequency. In some embodiments, the adaptation to converge the operating frequency and the resonance frequency may comprise or consist in controlling the operating frequency and the primary resonance frequency to be substantially the same. In some embodiments, the adaptation to converge the operating frequency and the resonance frequency may comprise or consist in controlling the operating frequency and the primary resonance frequency to have a difference less than a threshold. The threshold may be substantially less than the reciprocal of a data symbol (typically bit) time period, such as typically no higher than ten times less the reciprocal of a data symbol (typically bit) time period. In many embodiments, the threshold may be less than 500 Hz, 200 Hz, 100 Hz, 50 Hz, or 10 Hz.

In some embodiments, the adaptor may be arranged to converge the operating frequency and primary resonance frequency by maintaining a fixed relationship between them. The relationship may specifically be an equality, i.e. the adaptor may maintain the same frequency for the operating frequency and the primary resonance frequency. In some embodiments, the operating frequency and the primary resonance frequency may be controlled by a single common signal. Thus, the fixed relationship, and thus the convergence, may be achieved by controlling the operating frequency and the primary resonance frequency from the same common signal.

In some embodiments, the adaptor may be arranged to converge the operating frequency and primary resonance frequency by biasing them towards each other.

The power signal may not be the main power transfer signal for providing high power transfer to the power receiver. In some scenarios, it may primarily be used as a communication carrier for the load modulation, and may e.g. only provide power to elements of the power receiver itself, or even to only the load used for load modulation.

The power receiver may provide power to an external load, such as for charging a battery or powering a device.

The adaptation of the operating frequency and the resonance frequency may be in response to the demodulation quality measure in the sense that the adaptation is based on/takes into consideration/is dependent on/is based on/reflects and/or is a function of the demodulation quality measure. The adaption may be in response to the demodulation quality measure in the sense that the operating frequency and the resonance frequency reflect/depend on/are determined as a function of the demodulation quality measure.

The load modulation receiver may be arranged to generate the demodulation quality measure during power transfer to the power receiver. Specifically, the load modulation receiver may be arranged to generate the demodulation quality measure during a power transfer phase (in which power is transferred to the power receiver by the inductive power signal). In many embodiments, a demodulation quality measure value may be generated with a repetition rate of no less than 0.2 Hz, 0.5 Hz, 1 Hz, 10 Hz, 100 Hz, or possibly even higher. In some embodiments, a demodulation quality measure value may be generated substantially continuously during the power transfer phase.

Similarly, the adaptor may be arranged to adapt the operating frequency and the resonance frequency during power transfer to the power receiver. Specifically, the adaptor may be arranged to adapt the operating frequency and the resonance frequency during a power transfer phase (in which power is transferred to the power receiver by the inductive power signal). In many embodiments, the operating frequency and the resonance frequency may be adapted with an update rate of no less than 0.2 Hz, 0.5 Hz, 1 Hz, 10

Hz, 100 Hz, or possibly even higher. In some embodiments, an adaptation of the operating frequency and the resonance frequency may be substantially continuous during the power transfer phase.

In many embodiments, the demodulation quality measure may reflect a demodulation reliability and/or error probability of data received by the load modulation receiver when demodulating the load modulation. The demodulation quality measure may specifically reflect a demodulation reliability of received data, such as an error rate or signal to noise ratio. The load modulation receiver may be arranged to determine the demodulation quality measure based on evaluating a demodulation performance measure for an ongoing load modulated data transmission being received from the power receiver.

In accordance with an optional feature of the invention, the demodulation quality measure comprises a modulation depth measure reflecting a difference measure for measurements of at least one of a current and a voltage of the variable resonance circuit for different modulation loads of the inductive power transfer.

This may provide improved performance in many scenarios, and may in particular provide an efficient measure for controlling the values of the operating frequency and the primary resonance frequency.

In accordance with an optional feature of the invention, the demodulation quality measure comprises a data demodulation error rate.

This may provide improved performance in many scenarios, and may in particular provide an efficient measure for controlling the values of the operating frequency and the primary resonance frequency.

In accordance with an optional feature of the invention, the adaptor is arranged to change the operating frequency and the resonance frequency in response to a detection of the data demodulation error rate exceeding a threshold.

This may provide a particularly low complexity and effective control. For example, the system may allow the converged operating frequency and primary resonance frequency to be controlled in response to other characteristics unless this results in an unacceptable error rate in which case the operating frequency and primary resonance frequency may be changed to again provide an acceptable error rate.

In accordance with an optional feature of the invention, the adaptor is further arranged to determine a power transfer property being a property of a power transfer to the power receiver, and the adaptor is arranged to adapt the operating frequency and the resonance frequency in response to the power transfer property.

This may provide particularly advantageous operation. In particular, the control of the operating frequency and the primary resonance frequency may simultaneously be controlled to provide improved power transfer and communication. Thus, the approach may provide an effective and low complexity approach for controlling the trade-off and contradictory preferences for power transfer optimization and communication reliability optimization.

The power transfer property may specifically be a property of the inductive power signal, such as a value indicating a power level of the inductive power signal or the efficiency of the power transfer signal (reflecting the difference between a power of the inductive power signal and a power extracted by the power receiver).

In accordance with an optional feature of the invention, the power transfer property reflects at least one of a power level for the power signal and a power transfer efficiency measure.

This may provide particularly advantageous performance, and in particular may provide advantageous trade-off and co-operation between communication and power transfer considerations and functionality.

In accordance with an optional feature of the invention, the power transmitter comprises a power controller for adapting a duty cycle of the drive signal in response to a power request receiver from the power receiver.

This may allow efficient power control while at the same time providing increased freedom in converging the operating frequency and the primary resonance frequency.

In accordance with an optional feature of the invention, the adaptor is arranged to adapt the operating frequency and the resonance frequency to deviate from a maximum power transfer efficiency frequency.

This may provide improved performance. In particular, the adaptor may be arranged to adapt the operating frequency and primary resonance frequency to increase power efficiency but the consideration of the demodulation quality measure may prevent this from being maximized. In particular, the Inventors have realized that this may degrade the reliability of the load modulation communication.

In accordance with an optional feature of the invention, the adaptor is arranged to adapt the resonance frequency and the operating frequency in response to an intermodulation measure indicative of an intermodulation between the resonance frequency and the operating frequency.

This may provide advantageous performance and/or facilitated implementation in many scenarios.

In accordance with an optional feature of the invention, the adaptor is arranged to perform a joint adaptation of the resonance frequency and the resonance frequency in response to the demodulation quality measure, the joint adaptation maintaining a fixed relationship between the operating frequency and the resonance frequency.

This may provide improved performance in many embodiments. The joint adaptation may generate a single output which directly translates into a frequency value for both the operating frequency and the primary resonance frequency. The fixed relationship may be an equality, i.e. the joint adaptation may be such that the operating frequency and the primary resonance frequency are always the same. Thus, the joint adaptation is arranged to maintain the operating frequency and the resonance frequency as being substantially identical.

In accordance with an optional feature of the invention, the power transmitter is arranged to determine the demodulation quality measure in response to a comparison of measured load modulation and expected load modulation for a reference data pattern.

This may provide a more accurate demodulation quality measure, and accordingly improved performance in many embodiments.

In accordance with an optional feature of the invention, the resonance circuit comprises a capacitive impedance and an inductive impedance; the power transmitter further comprises a frequency modification circuit for controlling the resonance frequency by slowing a state change for at least one of the capacitive impedance and the inductive impedance for a fractional time interval of at least some cycles of the drive signal, the frequency modification circuit being arranged to align at least one of a start time and an end time for the fractional time interval to transitions of a timing signal; and the driver is arranged to generate the timing signal to have transitions synchronized to the drive signal.

This may provide improved performance in many wireless power transfer systems. It may provide facilitated and/or improved adaptation of a power transmitter to provide a matching of the power transmitter to different power receivers. The approach may allow power transmitters to adapt to power receivers, thereby e.g. allowing power transmitters to be used with a range of power receivers.

The approach may in particular provide a highly efficient way of maintaining convergence between the operating frequency and the primary resonance frequency, and thus may reduce intermodulation and improve communication.

The slowing of the state change may be a slowing relative to a resonance circuit including only the capacitive impedance and the inductive impedance. The capacitive impedance and the inductive impedance may typically be coupled in a series or parallel resonance configuration. The state may specifically be an energy state, and specifically may be a voltage over the capacitive impedance and/or a current through the inductive impedance.

The fractional time interval has a duration which is less than a time period of the drive signal, and typically a duration which is less than half a time period of the drive signal. The start time and end times may typically be time instants relative to a time instant/event of each cycle (in which a fractional time interval is present). For example, the start time and end time may be considered relative to a zero crossing of the drive signal.

The capacitive impedance may typically be a capacitor and the inductive impedance may typically be an inductor. However, in some embodiments, the capacitive impedance and/or the inductive impedance may e.g. also include a resistive component (typically real-world components will tend to have a resistive component corresponding to losses etc.).

The resonance frequency may typically be reduced the longer the duration of the fractional time interval. The frequency modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be changed by the power transmitter increasing the duration of the fractional time interval, e.g. by changing the start time and/or end time for the fractional time interval.

In some embodiments, the power transmitter may be arranged to reduce the resonance frequency by increasing the duration of the fractional time interval.

The timing signal may in addition to the transitions which the fractional time interval timing is aligned to comprise other transitions. Such other transitions may in many scenarios be ignored by the frequency modification circuit (for example, the frequency modification circuit may only align to positive edge transitions and ignore negative ones or vice versa). The transitions of the timing signal may be any change of the value or property of the timing signal which can be detected and for which the timing can be determined. In many embodiments, the timing signal may be arranged to transition between two values and the transitions may be transitions between these two values, or e.g. may only be transitions in one direction.

The power signal may not be the main power transfer signal for providing high power transfer to the power receiver. In some scenarios, it may primarily be used as a communication carrier for the load modulation, and may e.g. only provide power to elements of the power receiver itself, or even to only the load used for load modulation.

The power receiver may provide power to an external load, such as for charging a battery or powering a device.

Alignment of the begin or end times of the fractional time intervals with transitions of the timing signal may in many scenarios correspond to the begin or end times substantially coinciding with the transitions, e.g. within $\frac{1}{50}^{th}$ of a cycle time.

The power transmitter may be arranged to slow the state change by impeding an energy flow between the inductive impedance and the capacitive impedance during the fractional time interval.

This may provide improved performance in many scenarios, and may in particular provide an effective adjustment of the resonance frequency. The approach may facilitate implementation. The energy flow may be impeded while being from the capacitive impedance to the inductive impedance, from the inductive impedance to the capacitive impedance, or both when it is from the inductive impedance to the capacitive impedance and when it is from the capacitive impedance to the inductive impedance.

Impeding energy flow may include both reducing energy flow and completely preventing any energy flow.

In many embodiments, the frequency modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing any current flow.

In accordance with an optional feature of the invention, the frequency modification circuit comprises a switch and rectifier and the frequency modification circuit is arranged to align one of the start time and the end time to the transitions and to align the other of the start time and the end time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

According to an aspect of the invention there is provided a of operation for a power transmitter for wirelessly providing power to a power receiver using an inductive power signal, the power transmitter comprising a variable resonance circuit for generating the inductive power signal in response to a drive signal, the variable resonance circuit having a resonance frequency being a variable resonance frequency; the method comprising: generating the drive signal for the variable resonance circuit, the drive signal having an operating frequency; demodulating load modulation of the inductive power signal by the power receiver; generating a demodulation quality measure; and adapting the operating frequency and the resonance frequency to converge, the adaptation of the operating frequency and the resonance frequency further being in response to a demodulation quality measure.

According to an aspect of the invention there is provided a wireless power transfer system including a power receiver and a power transmitter for wirelessly providing power to the power receiver using an inductive power signal; the power transmitter comprising: a variable resonance circuit for generating the inductive power signal in response to a drive signal, the variable resonance circuit having a resonance frequency being a variable resonance frequency; a driver for generating the drive signal for the variable resonance circuit, the drive signal having an operating frequency; a load modulation receiver for demodulating load modulation of the inductive power signal by the power receiver and for generating a demodulation quality measure; and an adaptor for adapting the operating frequency and the resonance frequency to converge, the adaptation of the operating frequency and the resonance frequency further being in response to a demodulation quality measure.

In accordance with an optional feature of the invention, the power transmitter further comprises a transmitter for transmitting an indication of a reference data pattern to the power receiver, the power receiver is arranged to load modulate the power signal with the reference data pattern indicated by the indication of the reference data pattern, and the power transmitter is arranged to determine the demodulation quality measure in response to a comparison of measured load modulation and expected load modulation for the reference data pattern.

This may provide a more accurate demodulation quality measure, and accordingly improved performance in many embodiments. It may furthermore provide a more flexible approach.

In accordance with an optional feature of the invention, the power receiver is arranged to load modulate the power signal with a reference data pattern, and the power transmitter is arranged to determine the demodulation quality measure in response to a comparison of measured load modulation and expected load modulation for the reference data pattern, the power receiver being arranged to determine a timing for load modulating the power signal by the reference data pattern relative to a timing signal received from the power transmitter.

This may provide a more accurate demodulation quality measure, and accordingly improved performance in many embodiments. It may furthermore facilitate synchronization between the power transmitter and power receiver.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
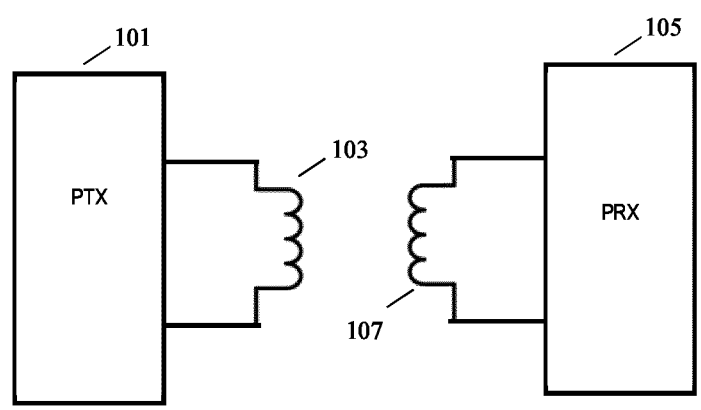
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a first power receiver 105 which includes (or is coupled to) a receiver coil/inductor 107.

The system provides a wireless inductive power transfer from the power transmitter 101 to the first receiver 105. Specifically, the power transmitter 101 generates a wireless inductive power signal (also referred to as a power signal, power transfer signal or an inductive power signal), which is propagated as a magnetic flux by the transmitter coil 103. The power signal may typically have a frequency between around 100 kHz to around 200 kHz. The transmitter coil 103 and the receiver coil 107 are loosely coupled and thus the receiver coil 107 picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

Figure 2:
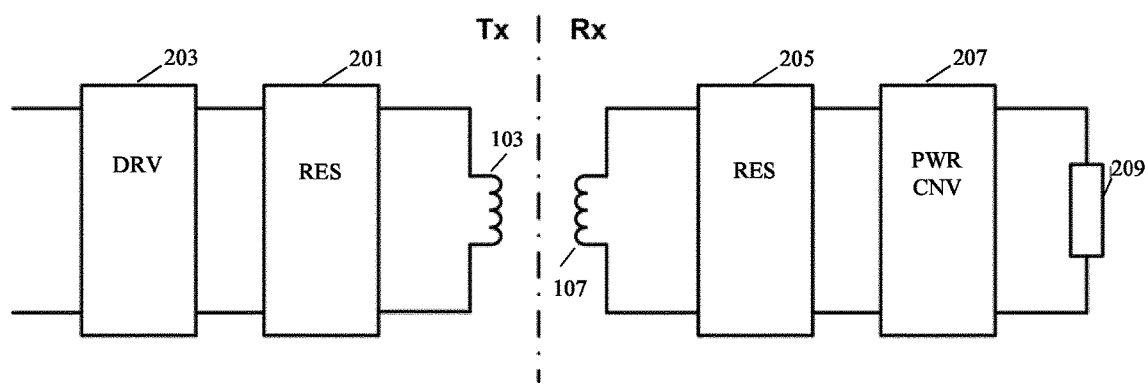
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201 which includes the transmitter inductor 103 (in FIG. 2, the transmitter inductor 103 is for clarity shown external to the resonance circuit 201 but is considered to be part of this). The resonance circuit 201 of the power transmitter 101 will also be referred to as the primary resonance circuit 201. The resonance circuit 201 may typically be a serial or parallel resonance circuit, and may in particular consist in a resonance capacitor coupled in parallel (or in series) to the transmitter inductor 103. The inductive power signal is generated by driving the output resonance circuit from a driver 203 generating a drive signal with a suitable operating frequency (typically in the 20-200 kHz frequency range). Thus, the variable resonance circuit/primary resonance circuit 201 is arranged to generate the inductive power signal in response to a drive signal.

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the secondary resonance circuit 205. The secondary resonance circuit 205 may typically be a serial or parallel resonance circuit, and may in particular consist in a resonance capacitor coupled in parallel (or series) to the receiver inductor 107. The secondary resonance circuit 205 is coupled to a power converter 207 which converts the received power transfer signal, i.e. the induced signal provided by the secondary resonance circuit 205, into a power that is provided to an external load 209 (typically by performing AC/DC conversion as will be well known to the skilled person). Typically, the two resonance circuits 201, 205 have resonance frequencies close to each other in order to achieve sufficient signal amplitude at the power receiver 105.

The load may for example be a battery and the power provision may be in order to charge the battery. Thus in some embodiments, the following description may apply to a scenario which implements a method of wirelessly charging a battery. As another example, the load may be a device and the power provision may be in order to power the device. Thus in some embodiments, the following description may apply to a scenario which implements a method of wirelessly powering a device.

In the system, the resonance circuit 201 of the primary resonance circuit 201 is not a fixed resonance circuit but rather is a variable resonance circuit that has a resonance frequency which is a variable resonance frequency. Thus, the effective resonance frequency of the resonance circuit 201 may be changed e.g. by changing component characteristics of an inductor and/or capacitor of the resonance circuit 201.

The system of FIG. 2 accordingly employs a tunable/adaptable/variable resonance circuit in order to provide additional functionality and/or improved operation. Specifically, the use of a variable resonance circuit 201 may allow the resonance frequency of the resonance circuit 201 to be adapted to correspond to the resonance frequency of the secondary resonance circuit 205. Such an adaptation may provide improved power transfer and specifically may provide improved power efficiency.

For example, the resonance frequency of the primary resonance circuit 201, henceforth referred to as the primary resonance frequency, may be set to be sufficiently similar to the resonance frequency of the secondary resonance circuit 205, henceforth referred to as the secondary resonance frequency, to allow the coupling to operate in the so called resonant regime.

When operating in this mode, the system can operate at low coupling factors, and with an acceptable efficiency. The power transmitters can achieve this efficiency by operating at a frequency that is close to its resonance frequency where the internal losses are lowest. The low coupling factors enable a much greater positioning tolerance, or a much larger design freedom with respect to the shape and size of the hand-held device. As such, operation in the resonant regime is attractive.

It will be appreciated that any suitable approach for changing the primary resonance frequency may be used. For example, the variation of the resonance frequency may be achieved by functionality allowing a resonance inductor or capacitor to be adjustable.

In some low complexity embodiments, a variable capacitor may for example be implemented by a plurality of parallel capacitors each of which is in series with a switch. For example, a plurality of capacitors with each capacitor approximately having half the capacitance of the previous capacitor may be provided. By switching the individual capacitor in or out, any capacitance up to twice the capacitance of the largest capacitor can be achieved with a resolution corresponding to the capacitance of the smallest capacitor.

It will be appreciated that the variability may alternatively or additionally e.g. be achieved by switching in and out parts of the inductor, or short circuiting e.g. series capacitors etc.

In many embodiments, a particularly advantageous approach may be used for adapting the effective resonance frequency of the resonance circuit 201. In the approach, the inductor current and/or inductor voltage may be controlled for a fraction of the time period for some cycles of the natural resonance of a resonance circuit with the duration of the fraction of the time period determining the effective resonance frequency of the circuit. The approach will be described in more detail later.

Figure 3:
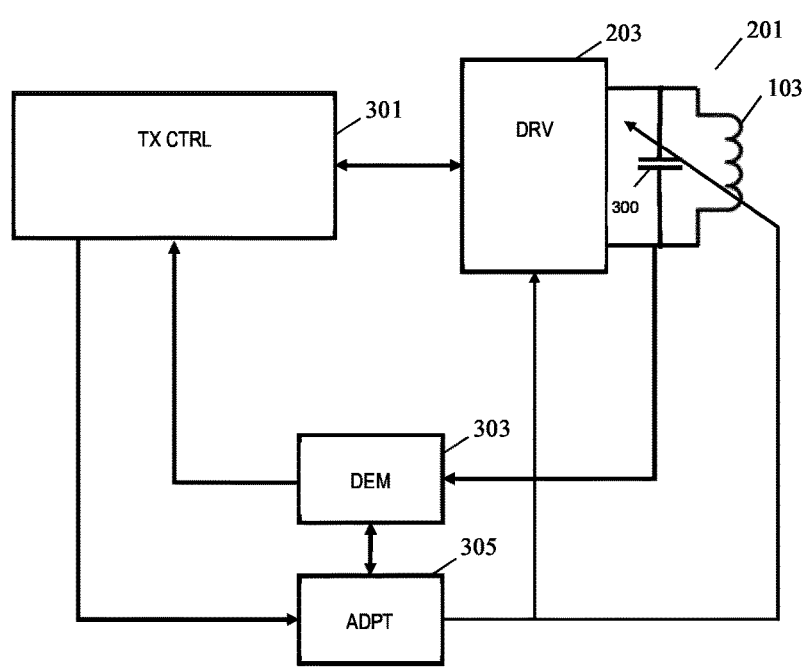
FIG. 3 illustrates an example of elements of a power transmitter in accordance with some embodiments of the invention.

FIG. 3 illustrates some exemplary elements of the power transmitter 101 of FIG. 1 in more detail.

FIG. 3 illustrates the driver 203 being coupled to the primary resonance circuit 201 which in the example is shown as comprising the transmit coil 103 and a resonance capacitor 300. The primary resonance circuit 201 is in the example a variable resonance circuit wherein the resonance frequency can be varied. Specifically, in some embodiments the resonance capacitor 300 may a controllable variable capacitor.

The driver 203 generates a varying (and typically AC) voltage drive signal which is applied to the resonance capacitor 300 and transmitter coil 103. In other embodiments, the primary resonance circuit 201 may be a series resonance circuit, and the voltage drive signal may be applied across the capacitor and inductor (thereby also providing a drive signal to the transmitter coil 103). In some embodiments, the driver 203 may be coupled directly (or indirectly) to the transmit coil 103 and the voltage drive signal may be provided to the transmit coil 103.

Thus, in the system, the driver 203 generates a drive signal which is fed to the primary resonance circuit 201/transmit coil 103, causing the transmit coil 103 to generate the power signal providing power to the power receiver 105. The driver 203 is arranged to generate the drive signal for the variable resonance circuit 201. The drive signal has an operating frequency.

Figure 4:
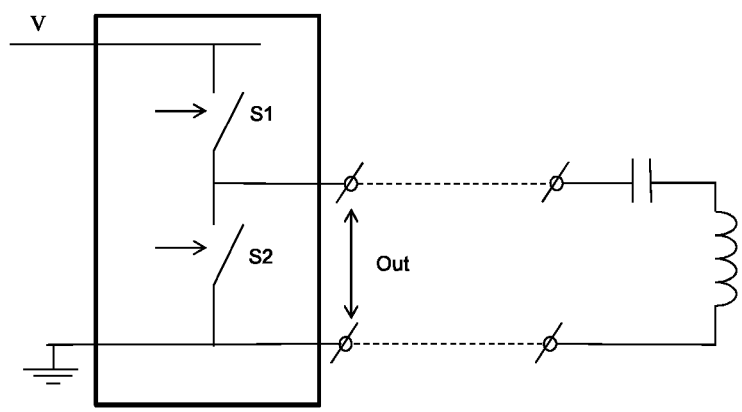
FIG. 4 illustrates an example of elements of a half-bridge inverter for a power transmitter in accordance with some embodiments of the invention.
Figure 5:
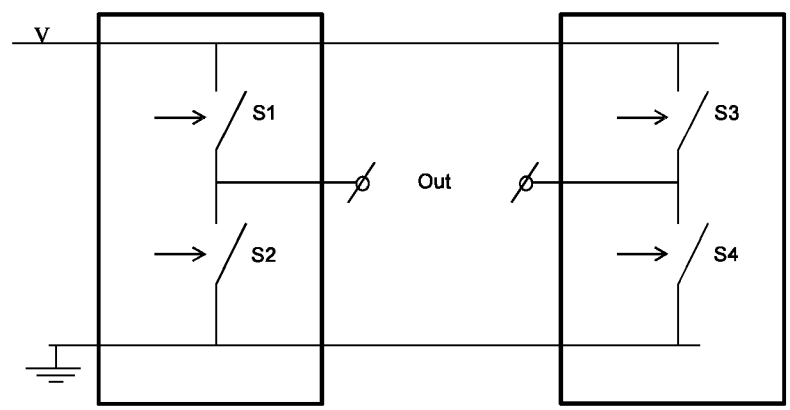
FIG. 5 illustrates an example of elements of a full-bridge inverter for a power transmitter in accordance with some embodiments of the invention.

The driver 203 generates the current and voltage which is fed to the transmitter coil 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 5 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency. The driver 203 accordingly generates a drive signal having a given operating frequency and applies this signal to the primary resonance circuit 201.

The driver 203 is also coupled to a transmitter controller 301 which comprises control functionality for operating the power transfer function, and which may specifically comprise a controller arranged to operate the power transmitter 101 in accordance with the Qi Specification as appropriate. For example, the transmitter controller 301 may be arranged to control the power transmitter 101 to perform the different Qi phases, including the Identification and Configuration phase and the power transfer phase.

In the example, the power transmitter 101 comprises a single transmitter coil 103 which is driven by the driver 203. Thus, the wireless inductive power signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the driver 203 may be used to generate the wireless inductive power signal. For example, two transmitter coils may be positioned at different positions to provide two charging points for two power receivers. The two coils may be fed the same output signal from the driver 203. This may allow an improved distribution of the wireless inductive power signal/magnetic field in order to support multiple charging points.

The power transmitter 101 further comprises a load modulation receiver in the form of a demodulator 303 which is arranged to receive data messages from the power receiver 105. Specifically, the demodulator 303 is arranged to demodulate load modulation of the wireless inductive power signal to determine the corresponding data transmitted from the power receiver 105. The load modulation receiver/demodulator 303 is thus arranged to demodulate load modulation of the inductive power signal by the power receiver.

On the physical level, the communication channel from the power receiver 105 to the power transmitter 101 is implemented by using the wireless inductive power signal as a communication carrier. The power receiver 105 transmits data messages by modulating the load of the receiver coil 107.

In the arrangement of FIG. 1, the power receiver 105 load modulates the wireless inductive power signal. The power receiver 105 may for example do this by connecting and disconnecting a capacitor coupled in parallel to the receive coil 107 thereby changing the resonance, and thus load characteristics of the power receiver 105. These changes result in corresponding variations in the power signal at the power transmitter side, and specifically in variation in the current and voltage of the transmitter inductor 103. These changes are directly or indirectly detected by the power transmitter 101 and used to demodulate the load modulation data from the power receiver 105.

The load modulation may e.g. be detected by a change in the amplitude and/or phase of the drive signal current/voltage, by a change in the current/voltage of the transmitter coil 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are communicated by load modulation.

In order to achieve efficient performance it is important to provide a high performance load modulation communication from the power receiver 105 to the power transmitter 101. However, in conventional power transfer systems, the communication tends to be suboptimal in some scenarios and situations leading to increased communication errors and suboptimal power transfer performance. This becomes especially relevant when the coupling between power transmitter and power receiver is low.

As mentioned, in the system, the demodulator 303 is arranged to demodulate the load modulation by detecting amplitude and/or phase variations of the current through the transmitter coil 103 and/or the voltage over the transmit coil 103. Accordingly, the demodulator 303 is coupled to the primary resonance circuit 201 and is arranged to measure at least one of the inductor current through the transmitter coil 103 and the inductor voltage across the transmitter coil 103.

In some embodiments, inductor current and/or voltage may be determined indirectly, such as e.g. by measuring the supply current variations to the inverter of the driver 203, or by measuring a current or voltage of a resonance capacitor etc. However, in the specific example, the inductor current/voltage is determined by directly sensing the inductor current or voltage.

The power transmitter 101 further comprises an adaptor 305 which is coupled to the primary resonance circuit 201 and the driver 203 and which is arranged to adapt/control both the operating frequency of the drive signal and the primary resonance frequency of the primary resonance circuit 201.

The adaptor 305 is arranged to adapt the primary resonance frequency and the operating frequency such that these converge towards each other. Thus, the adaptor 305 is arranged to bias/drive the primary resonance frequency and the operating frequency towards the same value. For example, the adaptor 305 may be arranged to drive both the primary resonance frequency and the operating frequency towards the same target frequency. In some embodiments, the adaptor 305 may allow a relatively small difference between the target frequency for the operating frequency and the target frequency for the primary resonance frequency, for example in some embodiments, the adaptor 305 may be arranged to converge the operating frequency and the primary resonance circuit 201 by biasing them towards target frequencies where the adaptor 305 are arranged to ensure that the difference between the target frequencies are below a threshold.

The target frequencies may be considered steady state target frequencies, i.e. the frequencies that the operating frequency and primary resonance frequency will reach if the operating conditions are constant.

In most embodiments, the adaptor 305 may be arranged to adapt the resonance frequency and the operating frequency to be substantially equal. Thus, the adaptor 305 is arranged to converge the operating frequency and the primary resonance frequency such that the steady state operating frequency will be substantially equal to the steady state primary resonance frequency. The steady state frequency may be the frequency that results if operational characteristics are kept constant.

Indeed, in some embodiments the adaptor 305 may be arranged to converge the operating frequency and the primary resonance frequency by keeping the frequencies substantially the same, i.e. the converging may correspond to maintain the operating frequency and the primary resonance frequency substantially the same. Indeed, in some embodiments the converging may be inherent in the adaptor continuously maintaining the operating frequency and the primary resonance frequency fully converged, i.e. by continuously maintaining the primary resonance frequency and the operating frequency identical. A specific example of such an implementation will be described later.

In some embodiments, the adaptor 305 may e.g. comprise different control loops for the adaptation of the operating frequency and for the primary resonance frequency. However, these control loops may be operated such that they drive the respective frequency towards the same value.

This may for example be implemented by one control loop being arranged to track the output of the other control loop.

For example, in some embodiments the adaptor 305 may comprise a first control loop which sets the operating frequency in response to various operating parameters including e.g. a desired power transfer characteristic (such as a power transfer efficiency). In addition, the adaptor 305 may comprise a second control loop which adjusts the primary resonance frequency to follow the operating frequency. Thus, the second control loop may simply be a control loop that seeks to set the primary resonance frequency to the same value as the operating frequency. In many embodiments, the response time of the second control loop may be several times faster than the response time of the first control loop resulting in the primary resonance frequency closely tracking the operating frequency.

It will be appreciated that in other embodiments, the first control loop may set the primary resonance frequency and the second control loop may control the operating frequency to track the primary resonance frequency.

In other embodiments, the adaptor 305 may perform a joint adaptation of the resonance frequency and the resonance frequency where the joint adaptation maintains a fixed relationship between the operating frequency and the resonance frequency. For example, a single control loop may generate a single signal which directly controls or sets both the operating frequency and the primary resonance frequency. The single signal may directly control the operating frequency and the primary resonance frequency such that these are the same although the common frequency may be varied. Thus, the system may implement a fixed relationship between the operating frequency and the primary resonance frequency which is an equality relationship, i.e. that they are the same and thus are fully converged. Examples of such an approach will be described later.

Thus, in the power transmitter of FIG. 3, the adaptor 305 is arranged to link the operating frequency and the primary resonance frequency together, and it may specifically lock them together such that they are identical.

In addition, the adaptor 305 is arranged to adapt the operating frequency and the primary resonance frequency in response to a demodulation quality measure. Specifically, in many embodiments, the adaptor 305 may be arranged to adapt an average or common frequency for the operating frequency and primary resonance frequency in response to a demodulation quality measure. For example, the adaptor 305 may be arranged to ensure that the operating frequency and primary resonance frequency are identical, and further that this common frequency is dependent on a demodulation quality measure.

The demodulation quality measure may be generated by the demodulator 303, and specifically may be generated by the demodulator 303 by evaluating an ongoing communication between the power receiver and the power transmitter. Thus, the demodulator 303 may be arranged to generate a demodulation quality measure, and specifically may be arranged to generate the demodulation quality measure by determining a demodulation performance metric for demodulation of load modulation of the inductive power signal by the power receiver. The demodulation quality measure may be generated to reflect a reliability of decoded/demodulated data, and specifically may be indicative of an error rate or error probability of demodulated data and/or a modulation depth and/or a signal to noise ratio for demodulated data. Specifically, the demodulation quality measure may be a measure reflecting an error probability for demodulated data.

In many embodiments, the adaptation of the operating frequency and primary resonance frequency may also be dependent on other parameters such as e.g. a power transfer efficiency. For example, the common frequency may first be set to provide a maximum power transfer efficiency. The communication quality may then be measured. If this is acceptable, i.e. if the demodulation quality measure exceeds a threshold, the system may continue to operate at this frequency. However, if the demodulation quality measure does not exceed the threshold, the common frequency may be changed, e.g. by a predetermined amount. If this does not result in an acceptable demodulation quality, the process may be repeated until the demodulation quality measure exceeds the threshold.

The approach of the adaptor 305 both converging the operating frequency and the primary resonance frequency and adapting the frequencies based on the demodulation quality measure may provide substantially improved performance in many embodiments. Indeed, the double control provides a synergistic effect where the linking of the operating frequency and the primary resonance frequency may provide improved power transfer operation with the demodulation quality measure further being capable of mitigating undesired side effects that can result from this linking, such as specifically reduced sensitivity to variations of loads providing load modulation.

Indeed, the Inventors have realized that substantially reduced intermodulation can be achieved by linking the frequencies but that this may in some scenarios and operating conditions have undesirable effects that can be mitigated by changing the frequencies considering communication quality.

The effect and realization may be illustrated by considering some practical examples. Specifically, the equivalent circuit of FIG. 6 may be considered.

Figure 6:
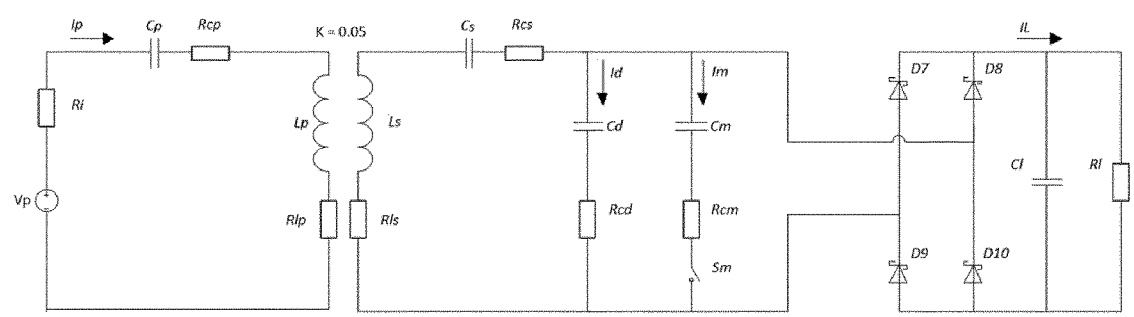
FIG. 6 illustrates an example of an equivalence diagram for a power transfer system in accordance with some embodiments of the invention.

The diagram of FIG. 6 represents a simple electrical model of the inductive power transfer system of FIGS. 1 and 2.

The primary resonance circuit 201 is represented by the components $C_p$, $R_{cp}$, $R_{lp}$, and $L_p$, where the resistors represent losses). The driver is represented by $V_p$ and $R_i$. The secondary resonance circuit 205 is represented by the components $C_s$, $R_{cs}$, $R_{ls}$, and $L_s$, where the resistors represent losses). The capacitor $C_d$ (with resistor $R_{cd}$ representing losses) creates a resonance at 1 MHz, which enables power transmitters that use a moveable coil to locate the power receiver. The capacitor $C_m$ (with resistor $R_{cm}$ representing losses) and switch $S_m$ represent the load modulation by the power receiver 105. Diodes $D_7$ to $D_{10}$ and $C_1$ and $R_1$ represent the load of the power receiver 105 (with the diodes providing rectification).

The circuit has been simulated for values typical of a Qi wireless power transfer system. In such a system, the primary resonance frequency is in the interval of $f_p=(93\pm7)$ kHz, and the secondary resonance frequency is in the interval of $f_s=(100\pm5)$ kHz. The coupling factor k between the two is equal to $M/\sqrt{L_pL_s}$, with M the mutual inductance between the two coils. In the examples, the coupling factor k is set to a value of 0.05.

Figure 7:
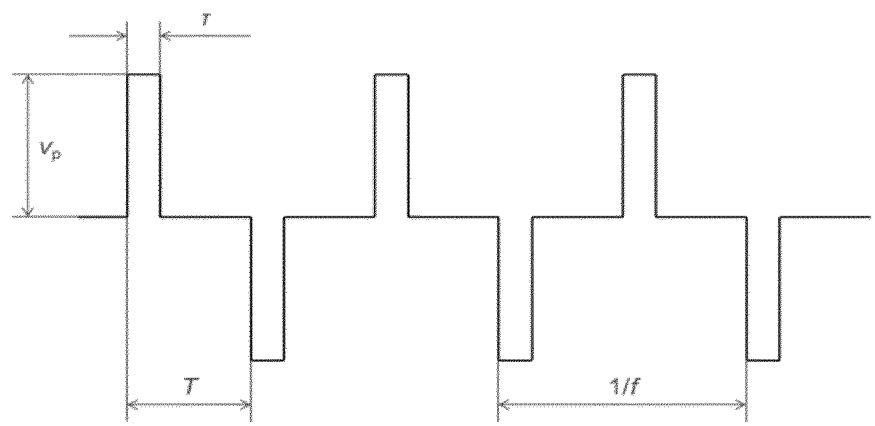
FIGS. 7-11 illustrate examples of signals of different power transfer systems and different operating characteristics.

In the example, the operating frequency $f_o$ and duty cycle D=Ton/T of the drive signal may be varied, e.g. to provide the desired power transfer characteristics (see FIG. 7).

The circuit has been analyzed with the following exemplary values:

| Power transmitter | | | Power receiver | | |
| --- | --- | --- | --- | --- | --- |
| $L_p$ | 100 | µH | $L_s$ | 20 | µH |
| $f_p$ | 93 | kHz | $f_s$ | 100 | kHz |
| $Q_p$ | 30 | | $Q_s$ | 25 | |
| $v_p$ | 20 | V | $C_m$ | 22 | nF |
| D | 0.1 | | $C_l$ | 10 | µF |
| $R_i$ | 0.5 | Ω | $R_{cs}$ | 0.25 | Ω |
| $R_{cp}$ | 0.25 | Ω | $R_{cd}$ | 0.25 | Ω |
| $f_{ping}$ | 175 | kHz | $R_{cm}$ | 0.25 | Ω |
| | | | $v_{L,0}$ | 5.0 | V |
| | | | $P_{L,0}$ | 5.0 | W |

Figure 8:
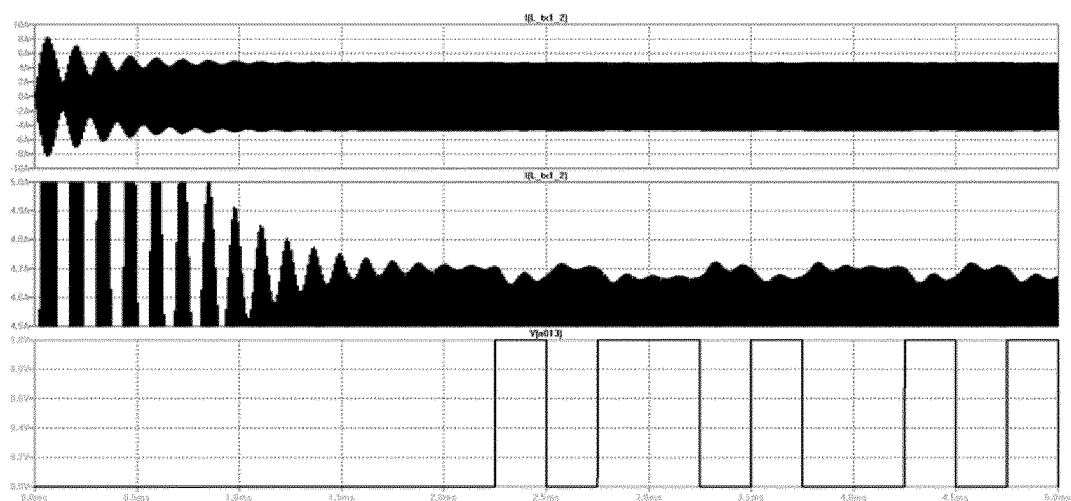

FIG. 8 illustrates the simulation results for the following parameters:
k=0.05, $f_o$=100 kHz, $f_p$=93 kHz, $f_s$=100 kHz.

The two first curves illustrate the current through the transmitter coil 103 ($L_p$) with the second curve illustrating a magnified view. The lowest curve shows the load modulation by the power receiver (specifically the switch signal for switch $S_m$).

As can be seen, when the power signal is first switched on, an oscillation occurs. Essentially, the power transmitter operates similarly to an under damped resonance circuit. Indeed, the oscillation can be considered an intermodulation effect between the drive signal and the primary resonance circuit 201. Thus, the oscillation represents intermodulation with a frequency of $f_o-f_p$=7 kHz. It can also be seen that the oscillations gradually subside and are effectively attenuated at t=2.0 ms (mainly due to the load of the power receiver).

In the example, load modulation starts at t=2.25 ms with the example providing a load modulation corresponding to a burst signal with a modulation clock frequency of $f_m$=2 kHz. As can be seen, the step changes of the load modulation effectively excites the intermodulation resulting in oscillations, i.e. the load modulation steps can be considered a step function exciting the under damped resonance circuit. As can be seen, the oscillations are significant and may exceed or substantially reduce the difference caused by the variation of the load modulation data. This may substantially reduce the reliability of the demodulation and even in many scenarios prevent reliable demodulation (compensating for the oscillations in the demodulation will require very complex and typically costly functionality).

Figure 9:
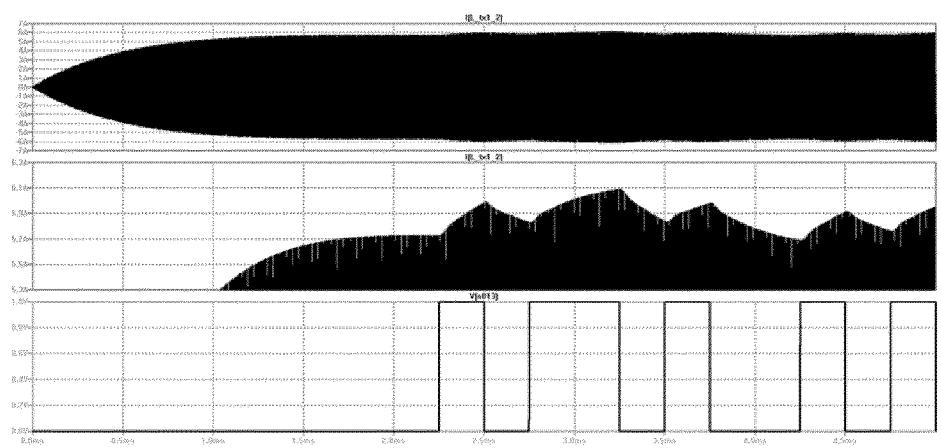

FIG. 9 illustrates the simulation results for the following parameters:
k=0.05, $f_o$=93 kHz, $f_p$=93 kHz, $f_s$=100 kHz.

Thus, in this example the operating frequency and the primary resonance frequency are set to the same value.

As can be seen, this effectively removes the oscillations. Indeed, the circuit may still be considered to correspond to an under damped resonance circuit but no intermodulation effects are present. As a result, the demodulation of the data may be facilitated substantially and a much more reliable demodulation can be performed.

Thus, as illustrated, by converging the operating frequency and primary resonance frequency, improved demodulation of load modulation can be achieved.

Figure 10:
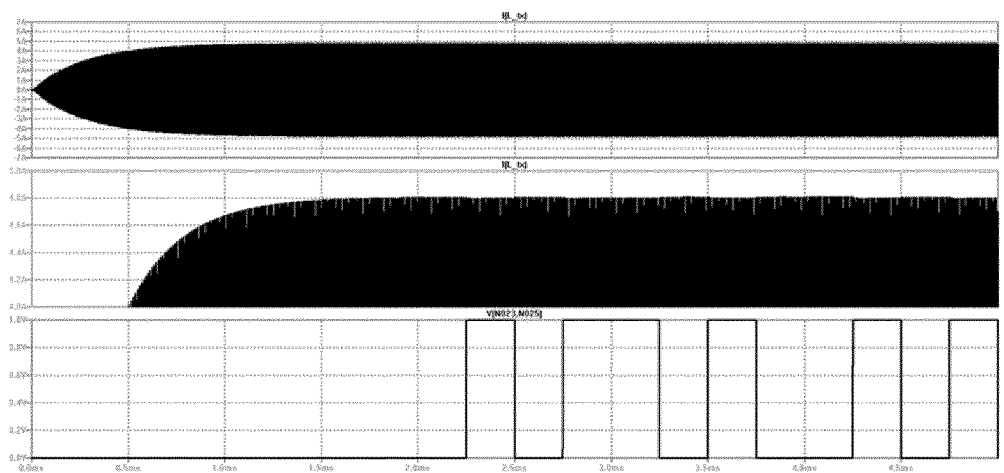

FIG. 10 illustrates the simulation results for the following parameters:
k=0.05, $f_o$=93 kHz, $f_p$=93 kHz, $f_s$=93 kHz.

Thus, in this example, the operating frequency and primary resonance frequency are also set to the same value. However, in contrast to the scenario of FIG. 9, the operating frequency and primary resonance frequency are now also the same as the resonance frequency.

Again, it can be seen that no intermodulation oscillations occur by virtue of the operating frequency and primary resonance frequency being converged.

This situation may be attractive from a power transfer perspective as it may result in a very efficient power transfer, and indeed may in many scenarios result in a maximum power transfer efficiency. Thus, a power transfer approach which keeps the operating frequency and primary resonance frequency identical and optimizes for power efficiency may be driven towards such an operating point.

However, as can be seen, whereas the operating frequency and the primary resonance frequency being equal prevents intermodulation oscillations, setting them to also be the same as the secondary resonance frequency results in the amplitude no longer having a strong dependency on the modulation load, i.e. the modulation/demodulation depth is reduced to very low levels thereby rendering the demodulation difficult and unreliable.

Thus, there may be conflicting requirements between adapting the primary resonance frequency/operating frequency for power transfer and for communication. Furthermore, the impact of setting the frequencies to the same or similar values may depend on the specific load which is used for load modulation.

Figure 11:
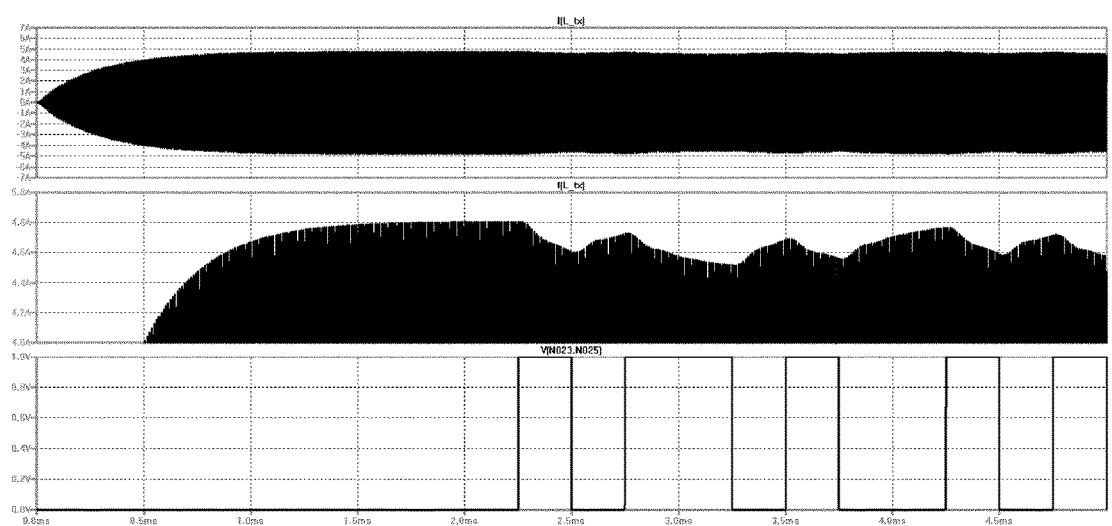

For example, FIG. 11 illustrates an example corresponding to that of FIG. 10 but with the modulation load being a resistor rather than a capacitor. As can be seen, in this case, the impact of switching the load in and out can clearly be differentiated.

In many systems, the power transmitter may not know exactly which modulation load may be used by the power receiver. However, in the power transmitter 101 of FIG. 3, the adaptor 305 may control the converged frequency (i.e. the operating/primary resonance frequencies) depending on a demodulation quality measure. Accordingly, it may specifically be used to prevent situations such as those of FIG. 10 from occurring.

In many embodiments, the adaptor 305 may be arranged to further adapt the operating frequency and the primary resonance frequency in response to a power transfer property, such as an operating parameter of the power transfer. The adaptor 305 may specifically be arranged to adapt a converged/common/target frequency value for the operating frequency and primary resonance frequency in response to a power transfer property.

Thus, the system may be arranged to converge the operating frequency and the primary resonance frequency, and specifically to keep the operating frequency and primary resonance frequency locked to each other, while adjusting this common frequency based on considerations of both the power transfer and the communication operations.

The power transfer property may specifically be a power transfer efficiency measure. For example, the adaptor 305 may be arranged to adapt the common frequency such that the power efficiency is increased as much as possible subject to the communication quality remaining sufficiently high. The adaption towards maximum efficiency will typically drive the common frequency towards the secondary resonance frequency. However, as this for some load modulation approaches (specifically capacitive load modulation approaches) will result in reduced demodulation depth and accordingly reduced communication quality, the adaptor 305 may be arranged to detect when the demodulation quality measure falls below a given threshold value. When this happens, the adaptor 305 may change the frequency towards a less power efficient setting (i.e. towards a setting providing better communication).

Thus, in the example, the adaptor 305 is arranged to adapt the operating frequency and the resonance frequency such that they deviate from the maximum power transfer efficiency frequency, i.e. they deviate from the frequency at which the power transfer will have the highest efficiency. Although, it is desirable to increase the efficiency, and indeed the adaptor 305 may be arranged to bias the system towards increased efficiency, this is subject to the requirement for the demodulation quality measure to meet an acceptability criterion. As illustrated by FIG. 10, this is often not feasible at the frequency for which the efficiency is maximum, and thus the adaptor 305 is arranged to prevent the common frequency from reaching this value.

The power transfer efficiency may for example be determined by the power transmitter calculating the total power supplied to the transmitter coil 103. The power receiver 105 may calculate the total power received by the receive coil 107 and may communicate this value back to the power transmitter. The power transmitter may then calculate the ratio between these to determine the power transfer efficiency. As another example, the difference between the transmitted and received power, and this difference may be used as an indication of the power transfer efficiency, i.e. the difference may also be used as a power transfer efficiency measure.

In some embodiments, the adaptor 305 may also be arranged to adapt the operating frequency and primary resonance frequency in response to a power level of the power signal. The power level may specifically be a current power level of the power signal or may be a requested or desired power level.

For example, the power receiver may transmit power control error messages back to the power transmitter 101, and the adaptor 305 may in response to these power control error messages change the common frequency for the drive signal and the primary resonance circuit 201. For example, if an increase in power is requested, the common frequency may be shifted towards the secondary resonance frequency.

However, due to the operating frequency and the primary resonance frequency being locked together, the use of the operating frequency for power control will tend to be less efficient and practical than for e.g. conventional systems wherein the primary resonance frequency and the secondary resonance frequency are kept constant and only the operating frequency is changed.

Therefore, in many embodiments, the power transmitter 101 may also comprise a power controller which is arranged to adapt the duty cycle of the drive signal in response to power requests received from the power receiver. Specifically, if the power receiver 105 requests a power increase, the duty cycle is increased and if it requests a power decrease, the duty cycle is decreased. Thus, the approach of implementing power control using the duty cycle (e.g. rather than by changing the operating frequency) allows for improved performance and in particular provides an additional degree of freedom which can mitigate the impact of the operating frequency and the primary resonance frequency being locked together.

It will be appreciated that different demodulation quality measures may be used in different embodiments and that any measure that may provide an indication of specifically the reliability of the demodulation may be used. Specifically, any direct or indirect indication of the resulting bit error rate may be used.

In many embodiments, the demodulator 303 may generate the demodulation quality measure to be indicative of an error probability for received/demodulated load modulation data. Such a demodulation quality measure may include a direct measure such as an error rate but may also include indirect measures, such as a signal to noise ratio or a demodulation depth.

The demodulator 303 may be arranged to generate the demodulation quality measure during a power transfer operation when power is transferred from the power transmitter to the power receiver by the inductive power signal. The demodulation quality measure may be generated during a power transfer phase, and in many embodiments, the system may be arranged to at regular/frequent intervals during the power transfer phase/operation determine new values for the demodulation quality measure and to adapt the operating frequency and the resonance frequency. In many embodiments, the adaptation update rate and/or the update rate for the demodulation quality measure may be no less than 0.2 Hz, 0.5 Hz, 1 Hz, 10 Hz, 100 Hz.

Indeed, in some embodiments, the demodulation quality measure may comprise/reflect a data demodulation error rate, such as specifically a bit error rate. The bit error rate may in some embodiments be measured directly. For example, the received data may include error correcting coding and the number of errors corrected by this error correcting code may be measured and used as the demodulation quality measure.

In other embodiments, the received data may comprise a checksum and the error rate may be determined in response to the received data not matching the received checksum.

As previously mentioned, the adaptor 305 may be arranged to change the operating frequency and the resonance frequency when it detects that the demodulation quality measure falls below a threshold. As a specific example, the adaptor 305 may be arranged to change the operating frequency and the resonance frequency when it detects that the data demodulation error rate exceeds a threshold. The threshold may for example correspond to no errors, i.e. if the adaptor 305 detects a single error, it may proceed to change the common frequency to differ further from the secondary resonance frequency.

In many wireless power transfer systems, the amount of data communicated is relatively low, and accordingly it may not be practical or advantageous to base a demodulation quality measure on the actual bit errors that occur as these typically only occur rarely.

In many embodiments, other indications of the reliability of the demodulation may instead be used. For example, the demodulator may generate soft-decision symbols as part of the demodulation and the demodulation quality measure may be determined to be indicative of the determined reliability indicated by these soft decisions.

In many embodiments, the demodulation quality measure may comprise a demodulation depth measure reflecting a difference measure for measurements of at least one of a current and a voltage of the variable resonance circuit for different modulation loads of the inductive power transfer.

Specifically, for load modulation, the current and/or voltage of the transmitter coil 103 will vary as a function of the load by the power receiver 105. Thus, when the modulation load of the power receiver 105 changes there will be a change in the current/voltage. The difference between these values for different settings of the power receiver modulation load may be measured and e.g. the difference or ratio of these may represent the modulation/demodulation depth. The higher the demodulation depth, the more reliable the demodulation is likely to be. Thus, the demodulation depth may be a good indication of the demodulation quality. An advantage of considering the demodulation depth for a demodulation quality measure is that it does not require actual demodulation to be performed in order for it to be measured. Furthermore, each data symbol may provide an indication of the demodulation depth and the determination of the demodulation quality measure will not be based on typically rare events such as bit errors.

Specifically, modulation depth or demodulation depth may be a difference between the result of a (direct or indirect) measurement of a transmitter inductor current or voltage for a first load state of the load modulation and the result of a (direct or indirect) measurement of a transmitter inductor current or voltage for a second load state of the load modulation. In many embodiments, the load modulation may be performed by the receiver switching between two load states for the load modulation, such as e.g. by connecting and disconnecting a capacitor across the receive inductor of the power receiver. In such cases, the demodulation depth may be the difference in inductor current/voltage measurements resulting from the two load states. The demodulation depth may be measured as an absolute or relative value, such as e.g. the ratio between the measurement values for the two load states. The determination of demodulation depth may include low pass filtering and/or averaging. E.g. the demodulation depth may be generated by comparing low pass filtered versions of first measurements for different load states, or may e.g. be generated by low pass filtering demodulation depth values generated from first measurements for different load states.

In some embodiments, the adaptor 305 may be arranged to adapt the resonance frequency and the operating frequency in response to an intermodulation measure indicative of an intermodulation between the resonance frequency and the operating frequency.

The intermodulation measure may specifically be measured by applying a suitable filter to e.g. a measurement of the transmitter inductor current. The filter may be a bandpass filter which extracts frequencies in a frequency band in which the intermodulation oscillations are expected to occur. The amplitude of the output of this filter may accordingly be measured and considered to be an indication of the intermodulation between the resonance frequency and the operating frequency.

The intermodulation measure may in some embodiments be used by the adaptor 305 to converge the operating frequency and the primary resonance frequency. For example, a loop may be implemented which adjusts one of the operating frequency and the primary resonance frequency to minimize the intermodulation measure.

In some embodiments, the adaptor 305 may adapt the target frequencies of the operating frequency and primary resonance frequency in response to the intermodulation measure. For example, in some embodiments, the link between the operating frequency and the primary resonance frequency may be relatively inaccurate and as a result, it may be possible that some intermodulation occurs in some scenarios. The target frequencies may in this case depend on how large intermodulation is currently present. For example, if the intermodulation measure is low, it may be acceptable to drive the operating frequency and primary resonance frequency closer to the primary resonance frequency than if the intermodulation measure is higher.

The previous description has specifically focused on embodiments wherein the adaptor 305 is arranged to converge the operating frequency and the primary resonance frequency to a point where they are substantially identical. However, it will be appreciated that in some scenarios or situations, the adaptor 305 may be arranged to converge the primary resonance frequency and the operating frequency to be similar but not necessarily the same. For example, the adaptor 305 may in some embodiments allow a difference to exist between the operating frequency and the primary resonance frequency. In many embodiments, the adaptor 305 may converge the operating frequency and the primary resonance frequency towards a difference which is much less than the reciprocal of a data symbol duration for the load modulation. For example, a load modulation symbol may have a duration of no more than 0.5 msec, corresponding to a reciprocal value of 2 kHz. The adaptor 305 may be arranged to converge the operating frequency and the primary resonance frequency to have a maximum difference of no more than a tenth of the maximum value of the reciprocal of a load modulation data symbol duration, i.e. in the specific example it may allow a frequency difference of up to 200 Hz.

By ensuring that any difference between the operating frequency and the primary resonance frequency is much lower than the reciprocal of a load modulation data symbol duration it can be assured that any intermodulation oscillations are so slow that they do not substantially impact the demodulation.

It will be appreciated that the adaptor 305 converging the operating frequency and the primary resonance frequency does not necessarily require that the convergence is increased but may also include the feature that a level of convergence is maintained. Specifically, the adaptor 305 may converge the operating frequency and the primary resonance frequency by adapting at least one of the operating frequency and the primary resonance frequency such that a difference between the operating frequency and the primary resonance frequency does not exceed a given value. Thus, a given minimum of convergence between the operating frequency and the primary resonance frequency may be maintained by the adaptor 305.

In some embodiments, the power transmitter may be arranged to determine the demodulation quality measure in response to a load modulation of a reference data pattern, which specifically may be a predetermined data pattern. The reference/predetermined data pattern may thus be a pattern that is known to the power transmitter in advance of the actual communication of the pattern. Thus, in this example, the power transmitter can base the determination of the demodulation quality measure on knowledge of the specific data that is being communicated.

Specifically, the demodulator 303 may be arranged to generate a demodulation quality measure based on an assumption of the data being load modulated on to the power signal being known and having predetermined values.

As a low complexity example, the demodulator 303 may simply demodulate the data and determine whether the demodulated data matches the reference data pattern. The demodulation quality measure may for example indicate the number of errors detected, or simply indicate whether any errors were detected.

As another example, the predetermined data pattern may be determined to correspond to a specific expected pattern for the measurements of e.g. the inductor current. The demodulator 303 may compare the actual measurements to the expected measurements (e.g. after a normalization) and may generate a difference measure indicating how closely the actual measurements match the expected measurements. This difference measure may in some embodiments be used directly as the demodulation quality measure. Alternatively, a binary demodulation quality measure may be generated by comparing the difference measure to a threshold with the demodulation quality measure indicating whether the threshold is exceeded or not.

The reference data pattern may for example correspond to a pre-amble of a data packet or may indeed in itself be a data packet, such as specifically a pre-defined data packet comprising only pre-defined data.

In some embodiments, the reference data pattern may for example be a bit data pattern that is defined e.g. in a Technical Specification for the system. Thus, the reference data pattern may be a static predefined data pattern.

However, in other embodiments, a more dynamic reference data pattern may be used. For example, the power transmitter may in some embodiments transmit an indication of a reference data pattern to the power receiver. The indication may for example select one data pattern out of a predefined set of data patterns. As another example, the power transmitter may directly transmit the reference data pattern to the power receiver, i.e. the indication of the reference data pattern may include the reference data pattern itself.

The power receiver may then be arranged to use the indicated reference pattern, i.e. the power receiver may proceed to load modulate the indicated reference data pattern on to the power signal.

The power transmitter may now know the data being communicated and accordingly it may proceed to determine a distance measure reflecting how closely the measured load modulation matches the expected load modulation for the reference data pattern. The power transmitter may e.g. directly compare the demodulated data to the reference data pattern, or may e.g. compare the actual inductor current measurements to expected current measurements. The difference measure may in some embodiments be used directly as the demodulation quality measure.

It will be appreciated that the power transmitter and power receiver may comprise functionality for suitably synchronizing the comparison in the power transmitter to the actual transmission times for the reference data pattern by the power receiver.

For example, the power transmitter may be arranged to determine the demodulation quality measure for different time offsets within a suitable time window, and may select the lowest determined demodulation quality measure (as this will correspond to the closest timing synchronization). As another example, a specific trigger event may be used, such as e.g. the detection of a step change in the loading of the power signal.

In many embodiments, the timing of the transmission of the reference data pattern may be restricted such that the power transmitter may be able to reasonably accurately predict the timing of the transmission.

For example, the power receiver may be required to transmit the reference data pattern within a given time interval following an event, such as specifically within a given time interval of a signal or data message being provided to the power receiver. The power transmitter may accordingly expect the reference data pattern to be received within a well-defined time interval.

The signal/message synchronizing the transmission and detection of the reference data pattern may for example be a start-up signal, a (frequency, amplitude, phase modulation) of the power signal, or specifically the transmission of the indication of the reference data pattern.

The previous description has focused on a description wherein load modulation is applied to the main power signal, i.e. to the power signal which also provides the main power transfer to the power receiver. However, it will be appreciated that in other embodiments, the main power may be provided by a different inductive signal.

For example, a power transmitter may comprise two inductors where one is the main power transfer coil that can generate a strong power signal which can transfer high power levels. The second coil may predominantly be used as a communication coil which may provide a communication carrier that can be load modulated by a corresponding coil in the power receiver. This communication carrier provides power to at least the modulation load, but may also typically provide power e.g. to the internal communication functionality of the power receiver. Thus, although such a communication signal may not provide the full power transfer to the power receiver (and indeed there may e.g. be a more powerful power transfer signal), it is a power signal that provides power to the power receiver (and at least to the modulation load).

It will be appreciated that any suitable demodulation approach may be used based on the measurements of the inductor current and/or voltage. Indeed, the skilled person will appreciate that many demodulation techniques are available including a posterior or a priori maximum likelihood techniques. It will also be appreciated that any suitable approach may be used e.g. for synchronizing to data symbols etc.

Typically, the measurements may be processed (typically filtered or averaged, e.g. using a matched filter which matched to the data symbol shape) and the resulting output may be sampled at the optimum sampling instant as will be well known to the person skilled in demodulation techniques (ref. e.g. John Proakis, "Digital Communications", McGraw Hill, 2008, ISBN 0071263780). The resulting sample value may be compared to the expected values for different symbol values and the closest one selected (based on a suitable distance measure). Thus, a demodulation approach may be used wherein the received signal (measurements) is (are) compared to the expected signal (measurements) for different possible data symbols, and the demodulated data is determined as the possible data symbol having the lowest (typically Hamming) distance to the expected signal (measurements) is selected. It will be appreciated that the distance determination/comparison may include processing, such as e.g. filtering and averaging, of the measurements. Thus, typically a maximum likelihood approach where the nearest constellation point is selected may be used for demodulation.

As a low complexity approach for binary data symbols (i.e. a "0" or "1" is transmitted), the demodulator 311 may determine a threshold as a long term average of the measurements. The averaging will extend over multiple data values and will typically correspond to an average measurement value between the values resulting from respectively a "0" or a "1". When demodulating one bit, the demodulator 311 may average the measurements over a corresponding data symbol (bit) time period. If the resulting value is above the long term threshold, the data bit is demodulated as a "0" and if it is below the long term threshold, the data bit is demodulated as a "1" (assuming the load modulation is such that "0" results in higher values of the measurements than a "1").

It will be appreciated that many possible demodulation techniques are known to the skilled person and that any technique may be used without detracting from the invention.

In some embodiments, a particularly efficient way of maintaining the operating frequency and the primary resonance frequency to be converted may be used. In the example, the resonance circuit 201 is effectively restarted once for each cycle of the drive signal resulting in the effective resonance frequency of the resonance circuit 201 being given by the operating frequency rather than by the natural resonance frequency of the resonance circuit 201.

In the approach, the primary resonance circuit 201 is controlled in dependence on the drive signal driving the primary resonance circuit 201 thereby inherently allowing the operating frequency and the primary resonance frequency to be automatically linked together. Indeed, the approach allows the operating frequency and primary resonance frequency to automatically and inherently be substantially the same such that the system can simply adapt the operating frequency of the drive signal with the effective primary resonance frequency automatically and inherently being adapted to directly follow. The approach can specifically ensure that each cycle of the effective resonance of the primary resonance circuit 201 has the same duration as the corresponding cycle of the drive signal. In addition, the approach allows for this to be achieved with very low additional complexity and with a very low control overhead.

The specific approach will be described with reference to FIG. 12 which illustrates elements of the power transmitter in accordance with an example of such an approach. It will be appreciated that the example uses a series resonance circuit which may directly replace the parallel resonance circuit of FIG. 3. Thus, FIG. 12 may be considered to illustrate specific elements of the system of FIGS. 1-3 concerned with generating the power signal and with locking the operating frequency and the primary resonance frequency together.

In the example, the power transmitter comprises an inductive impedance and a capacitive impedance forming a resonance circuit.

In the specific example, the inductive impedance corresponds directly to an inductor but it will be appreciated that in other embodiments the inductive impedance may be any one port/two-terminal element which has an at least partial inductive impedance, i.e. which has an inductive reactance component, or in other words which has a complex impedance with a positive imaginary part. Thus, the inductive impedance may be a linear two-terminal circuit or (equivalent) component for which the voltage at the terminals is at least partly dependent on a derivative of the current through the component/circuit.

Similarly, in the specific example, the capacitive impedance corresponds directly to a capacitor but it will be appreciated that in other embodiments the capacitive impedance may be any one port/two-terminal element which has an at least partial capacitive impedance, i.e. which has a capacitive reactance component, or in other words which has a complex impedance with a negative imaginary part. Thus, the capacitive impedance may be a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedance will typically be much smaller, and often negligible compared to the reactance component. This will ensure that the oscillations are relatively undamped, i.e. it will provide a relatively high Q for the resonance circuit.

For clarity and brevity, the following description will focus on the inductive impedance being an (ideal) inductor 1201, and specifically the transmitter coil 103 of FIGS. 1 and 2, and the capacitive impedance being an ideal capacitor 1203. However, it will be appreciated that any reference to inductor 1201 may as appropriate be replaced by a reference to an inductive impedance or reactance, and that any reference to capacitor 1203 may as appropriate be replaced by a reference to a capacitive impedance or reactance. For brevity, the pair of the inductor 1201 and the capacitor 1203 will also be referred to as the resonating components.

The inductor 1201 and capacitor 1203 are coupled together in a resonant configuration. In the example, the inductor 1201 and capacitor 1203 are coupled in series resonance but it will be appreciated that in other embodiments they may be coupled in a parallel resonance configuration.

The inductor 1201 and capacitor 1203 will exhibit a natural resonance frequency corresponding to the resonance frequency of a resonance circuit comprising only the inductor 1201 and the capacitor 1203. As is well known, the resonance frequency for such a circuit is by ½π√LC where L is the inductance of the inductor 1201 and C is the capacitance of the capacitor 1203.

Figure 12:
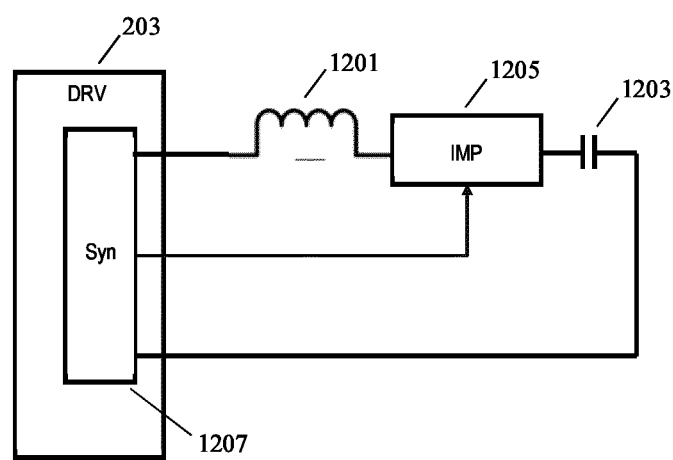
FIG. 12 illustrates an example of elements of a power transmitter in accordance with some embodiments of the invention.

However, in the system of FIG. 12, the power transmitter further comprises a frequency modification circuit 1205 which is arranged to control the resonance frequency for the resonance circuit by slowing a state change for the capacitor 1203 and/or the inductor 1201. The frequency modification circuit 1205 can be considered part of the resonance circuit (or may be considered fully or partly external to this). It will also be appreciated that although the frequency modification circuit 1205 is in FIG. 12 shown as single two terminal element coupled in series between the inductor 1201 and the capacitor 1203, this is merely an example and that other configurations will be used in other embodiments. For example, the frequency modification circuit 1205 in the example of FIG. 12 has only two terminals but it will be appreciated that in other embodiments, the frequency modification circuit 1205 may have more terminals and may be connected to other parts of the circuit, including e.g. to power supply rails for the driver.

The frequency modification circuit 1205 is arranged to modify the resonance frequency by slowing a state change for one or both of the inductor 1201 and the capacitor 1203. The state of the inductor 1201 and the capacitor 1203 may be considered to be represented by the current energy values for the component, and specifically may be considered to correspond to the current of the inductor 1201

$$\left( E = \frac{1}{2} L I^2 \right)$$

and the voltage of the capacitor 1203

$$\left( E = \frac{1}{2} C V^2 \right).$$

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 12, the resonance circuit is not allowed to simply perform a free running oscillation but rather the frequency modification circuit 1205 slows down the state change for at least one of the inductor 1201 and the capacitor 1203 during a fractional time interval of some, and typically all of cycles.

The state change is thus slowed during the fractional time interval relative to the state change of a free running resonance circuit comprising only the capacitor 1203 and the inductor 1201.

Specifically, the state change is slowed by impeding the energy flow between the capacitor 1203 and the inductor 1201 (by slowing the energy flow from the inductor 1201 to the capacitor 1203, from the capacitor 1203 to the inductor 1201, or both from the inductor 1201 to the capacitor 1203 and from the capacitor 1203 to the inductor 1201). In a resonant circuit positive current flows from the inductor 1201 to the capacitor 1203 for half of a resonating cycle, and from the capacitor 1203 to the inductor 1201 for the other half of a resonating cycle. In many embodiments, the slowing of the energy flow may be achieved by impeding the current flowing between the resonating components. In many embodiments, the frequency modification circuit 1205 may be arranged to impede current from the inductor 1201 to the capacitor 1203, e.g. by leading (some or all of the) current of the inductor 1201 away from the capacitor 1203 (including potentially leading both negative and positive currents away from the capacitor 1203). In other embodiments, the frequency modification circuit 1205 may be arranged to impede current from the capacitor 1203 to the inductor 1201, e.g. by disconnecting the capacitor 1203 from the inductor 1201 during the fractional time interval (thereby also setting the voltage across the inductor to zero, i.e. both the current and the voltage is set to zero for the inductor).

In these examples, the current flow between the resonating components is thus reduced or even prevented completely during the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration. This lower frequency will be referred to as the effective resonance frequency of the resonance circuit.

The frequency modification circuit 1205 may in this way control and adjust the effective resonance frequency to be lower than the natural resonance frequency. The actual effective resonance frequency is in the system of FIG. 12 controlled by the frequency modification circuit 1205 being capable of varying the timing/duration of the fractional time interval. Thus, the longer the fractional time interval is, the larger the effect of slowing the state change will be, and thus the lower will be the effective resonance frequency.

In the system of FIG. 12, the frequency modification circuit 1205 is not merely independently controlled to provide a desired resonance frequency. Rather, the operation of the frequency modification circuit 1205 is closely integrated with the driving of the resonance circuit 201 and thus with the power transfer and general operation of the power transfer system.

Specifically, in the system of FIG. 12, the driver 203 generates a timing signal and feeds this to the frequency modification circuit 1205. The timing signal includes transitions that indicate when the fractional time interval should start, end, or both (there may be other transitions that are ignored). The frequency modification circuit 1205 is arranged to align the fractional time intervals to these transitions.

Thus, the transitions of the timing signal controls the timing of the fractional time interval, and specifically controls a start time, an end time or both the start and end time.

The frequency modification circuit 1205 accordingly sets the start and/or end time of the fractional time interval from the timing signal. Typically, the timing signal is a switch signal which is used to control a switch of the frequency modification circuit 1205 which can activate/deactivate the impeding of the energy flow, i.e. it can activate/deactivate the slowing of the state change. The timing signal may include transitions which can be detected by the frequency modification circuit 1205 and used by this to directly or indirectly control a switch for switching in and out current impeding. The frequency modification circuit 1205 typically aligns a start or end time with the transitions by switching the slowing in or out substantially at the same time as the corresponding transition (say within $\frac{1}{50}^{th}$ of a cycle time period).

Thus, in the system, the driver 203 controls at least part of the timing of the fractional time interval. Furthermore, the driver 203 is arranged to control the timing signal such that this, and accordingly the fractional time interval, is synchronized to the drive signal. Specifically, the driver comprises a synchronizer 1207 which generates the timing signal and synchronizes this to the drive signal.

Accordingly, in the embodiment, the timing of the fractional time interval is closely linked to the drive signal. This linkage provides a close correspondence between the driving of the resonance circuit 201 and the effective resonance of the resonance circuit 201. The linking of the driving signal and timing signal specifically allows the resonance frequency to automatically be locked to be the same frequency as the operating frequency of the drive signal. Indeed, the synchronizer 1207 can synchronize the timing signal, and thus the fractional time interval, such that each cycle time of the resonance circuit 201 is the same as the cycle time for the corresponding cycle of the drive signal. Thus, the approach of controlling the fractional time interval by the driver and this being based on the drive signal can provide a system wherein the resonance frequency is always the same as the drive signal. Indeed, even the individual time periods of each individual cycle time can be controlled to be the same.

The approach not only allows for low complexity, and for example does not require any measurements or detections of any signals of the resonance circuit 201 (such as inductor or capacitor current or voltage), but it can also automatically guarantee that the frequencies are identical.

The approach may provide a number of advantages. In particular, it may reduce, and in many embodiments prevent, intermodulation. It may also in many embodiments provide improved power transfer, and specifically may improve power transfer efficiency. Typically, the power transfer efficiency is increased the closer the primary resonance frequency, the secondary resonance frequency and the operating frequency of the drive signal are to each other. The described approach allows the operating frequency and primary resonance frequency to be closely and automatically linked together while allowing them to be varied to match the secondary resonance frequency. Accordingly, only an adaptation of the drive signal to the secondary resonance frequency may be applied with the primary resonance frequency automatically also being set.

Figure 13:
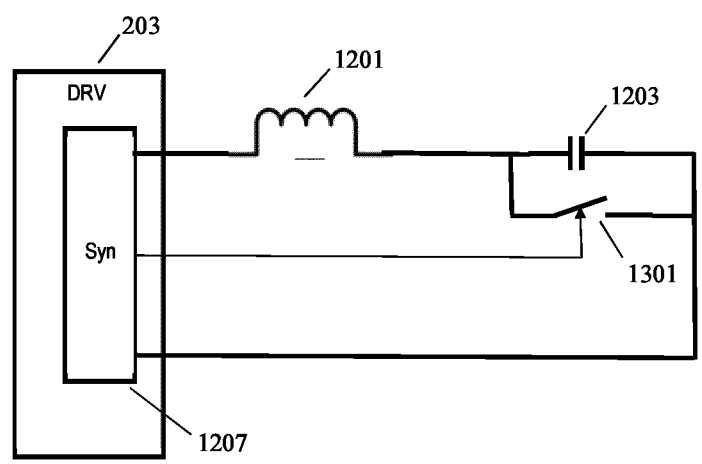
FIG. 13 illustrates an example of elements of a power transmitter in accordance with some embodiments of the invention.

FIG. 13 illustrates an example of the power transmitter of FIG. 12 wherein the frequency modification circuit 1205 is arranged to slow the state change of the capacitor 1203. In the example, the frequency modification circuit 1205 is arranged to divert current from the inductor 1201 away from the capacitor 1203 during the fractional time interval. The diversion is achieved by a switch 1301 which is coupled in parallel with the capacitor 1203 and which is arranged to short-circuit this. Thus, the frequency modification circuit 1205 may be implemented by a controllable switch.

In the example, the switch 1301 is closed during the fractional time interval. The opening and the closing of the switch 1301 is controlled by the transitions of the timing signal generated by the driver 203 and is accordingly synchronized to the switch signal. When the switch is closed, the current that is flowing through the inductor 1201, and which would otherwise charge or discharge the capacitor 1203, is instead diverted through the switch 1301. Thus, by short circuiting the capacitor 1203, the current bypasses the capacitor 1203 and accordingly does not charge the capacitor. In the example, switch 1301 is arranged to close at a time instant corresponding to the voltage across the capacitor 1203 being zero. At this time, there is substantial current through the inductor 1201 (indeed the current will be at the maximum level). However, by short-circuiting the switch, this current is no longer flowing through the capacitor 1203 but will instead flow through the switch 1301. Accordingly, the short circuit of the capacitor 1203 ensures that the voltage is maintained at zero, i.e. the state of the capacitor 1203 is kept constant.

It should be noted that the switch 1301 accordingly forms a current diversion path which may divert both positive and negative current from the capacitor 1203.

After a certain duration, i.e. at the end of the fractional time interval, the switch is opened again thereby resulting in the current flowing through the inductor now flowing into (or out of) the capacitor 1203. As a result, the capacitor 1203 starts charging and the capacitor voltage changes accordingly. This will result in the effective capacitance of the capacitor 1203 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)} * t2}{C1}.$$

Considering instead another capacitor C2 with a smaller value than C1 but being short circuited from 0 to t1 and charged in the time interval from t1 to t2, this capacitor is charged with the same average current $\overline{i(t)}$ to voltage U1(t2). For C2 the voltage can be determined as:

$$U2(t2) = \frac{1}{C2}\int_0^{t2} \overline{i(t)}dt = \frac{1}{C2}\int_0^{t1} 0 dt + \frac{1}{C2}\int_{t1}^{t2} \overline{i(t)}dt \rightarrow U2(t2) = \frac{\overline{i(t)} * (t2 - t1)}{C2}$$

If U1(t2) and U2(t2) are equal at t2, then C1 can be expressed by:

$$C1 = \frac{t2}{t2 - t1} * C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor.

Figure 14:
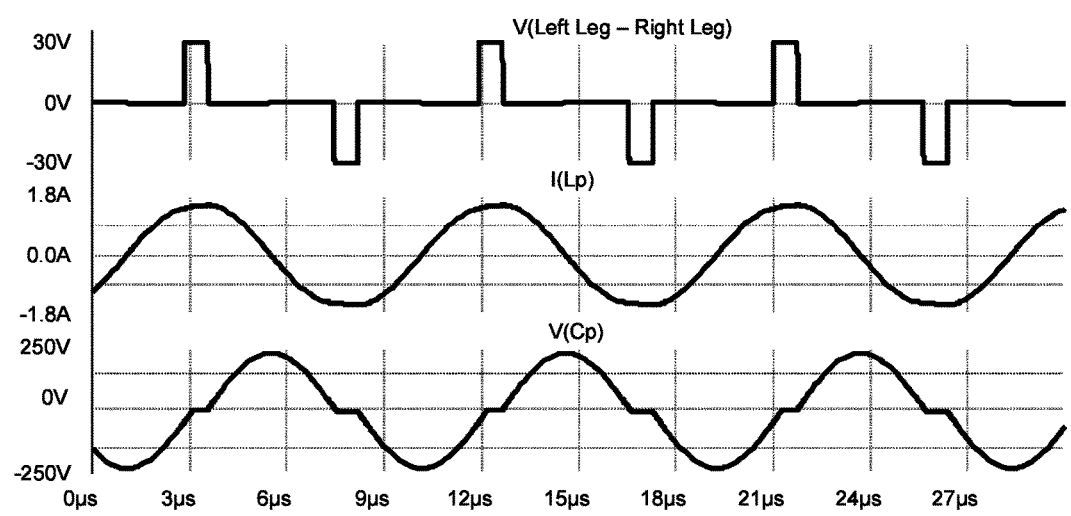
FIG. 14 illustrates examples of signals of a power transmitter in accordance with some embodiments of the invention.

An example of the signals in the circuit of FIG. 13 is provided in FIG. 14. In the example, the inductance of the inductor 1201 is Lp=200 uH and that capacitance of the capacitor 1203 is Cp=8.2 nF resulting in natural resonance frequency of:

$$fp = \frac{1}{2\pi * \sqrt{Lp * Cp}} = 125 \text{ kHz.}$$

In the example, the upper curve shows the drive signal.

As can be seen, for each cycle, the switch 1301 is arranged to short circuit the capacitor 1203 during a first fractional time interval (for a positive zero crossing of the capacitor voltage) and during a second fractional time interval (for a negative zero crossing of the capacitor voltage). In each fractional time interval, the voltage is thus kept constant for approximately 1 μs. During this time, the voltage of the capacitor 1203 does not change. Similarly, the current through the inductor 1201 hardly change either (it is almost constant at the maximum value) due to the inductor 1201 not being exposed to a voltage.

As can be seen, the effective resonance frequency is lowered, and indeed in the example, an effective resonance frequency of around 102 kHz is achieved.

The exact effective resonance frequency can be set simply by adjusting the duration of the fractional time intervals. The longer the duration, the lower the frequency.

Further, it can be seen that if the duration between the drive signal pulses is kept constant, the operating frequency of the drive signal can be changed by the duration of the drive signals pulses changing. However, this will directly result in the right edge of the timing signal changing in the same way, and by keeping the left edge of the timing signal coupled to the zero crossing of the capacitor it results in the fractional time intervals changing correspondingly. Accordingly, the resonance frequency will directly follow the drive signal operating frequency and will inherently be the same.

FIG. 8 illustrates another embodiment of the system of FIG. 12. In this example, the frequency modification circuit is arranged to slow the state change for the inductive impedance by impeding current flow (and specifically the rate of change of the current flow) from the capacitive impedance to the inductive impedance during the fractional time interval, or equivalently by reducing the voltage imposed by the capacitor over the inductive capacitance. Specifically, in the example, the frequency modification circuit is arranged to slow the state change for the inductive impedance by blocking current flow from the capacitive impedance to the inductive impedance during the fractional time interval, or equivalently by setting the inductor voltage to zero.

Figure 15:
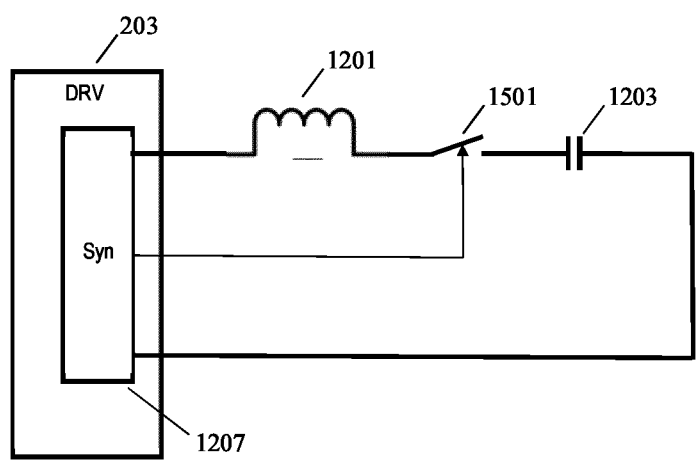
FIG. 15 illustrates an example of elements of a power transmitter in accordance with some embodiments of the invention.

In the example, the current from the capacitor 1203 to the inductor 1201 is blocked by a switch 1501 which is in series with the inductor 1201. In the example, the driver 203 is arranged to effectively disconnect the coupling between the capacitor 1203 and the inductor 1201 for part of resonance cycle. The driver 203 synchronizes the switch 1501 to the drive signal, and in principle operates as described for the example of FIG. 13. Indeed, in example of FIG. 13, the switch 1301 is arranged to freeze the voltage across the capacitor 1203 at zero by controlling the current through the capacitor 1203 to be zero. In the example of FIG. 15, the switch 1501 is arranged to freeze the current through the inductor 1201 at zero by disconnecting the inductor 1201 from the capacitor 1203 and so removing the influence of the voltage of the capacitor on the inductor. Thus, the two approaches are equivalent with the consideration that operation of a capacitor and inductor are the same when the roles of current and voltage are swapped. Indeed, the signals of FIG. 14 could also apply to the example of FIG. 15 if the curves for inductor current and capacitor voltage are swapped with respectively capacitor voltage and inductor current.

It should also be noted that in the provided examples, the state change of both the capacitor 1203 and the inductor 1201 are slowed, or substantially frozen, during the fractional time interval. Indeed, in the example of FIG. 13, during the fractional time interval, no current reaches the capacitor 1203 and the voltage is constant at zero. However, thus also sets the voltage across the inductor 1201 to zero and thus the inductor current is substantially constant, i.e. there is substantially no state change for the inductor 1201. Similarly, in the example of FIG. 15, during the fractional time interval, no current can flow from the capacitor 1203 and accordingly the voltage across the capacitor 1203 will be substantially constant, i.e. there is substantially no state change for the capacitor 1201.

In the previous examples, the start of the fractional time intervals have been synchronized with (and specifically aligned to) the zero crossings of respectively the inductor voltage and the capacitor current. In particular, the start time of the fractional time intervals are aligned with the zero crossings of respectively the capacitor voltage and the inductor current. This provides particular advantages when the current flow between the capacitor 1203 and inductor 1201 is reduced completely to zero during the fractional time intervals. However, it will be appreciated that in some embodiments, more gradual reductions in the current flow may be used.

It will be appreciated that the slowing of the state change, and the energy flow between the capacitor 1203 and the inductor 1201, may be achieved by reducing rather than completely preventing current flow between the resonating components. The reduced current may for example be achieved through a current regulating circuit which e.g. could be controlled in real time by a microcontroller.

Figure 16:
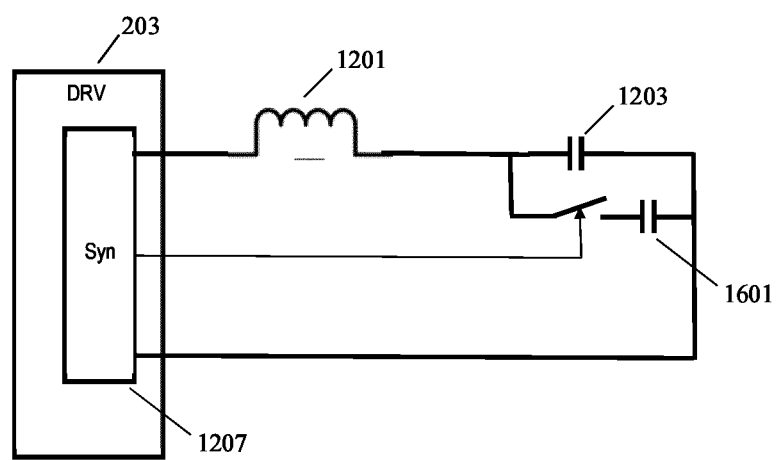
FIG. 16 illustrates an example of elements of a power transmitter in accordance with some embodiments of the invention.

However, as another example, the reduction may e.g. be achieved by including an additional capacitor or inductor during the fractional time intervals. For example, in the example of FIG. 16 an additional current reduction capacitor 1601 is inserted in series with the switch of FIG. 13. During the fractional time interval, the switch 1301 does not short circuit the capacitor 1203 but inserts the current reduction capacitor 1601 in parallel. This results in the current to the capacitor 1203 being reduced as part of the current flows into the current reduction capacitor 1601 during the fractional time interval thereby reducing the state change of the capacitor 1203 and so the voltage that the capacitor 1203 imposes on the inductor. (the current reduction capacitor 1601 is charged and discharged together with the capacitor 1203).

Figure 17:
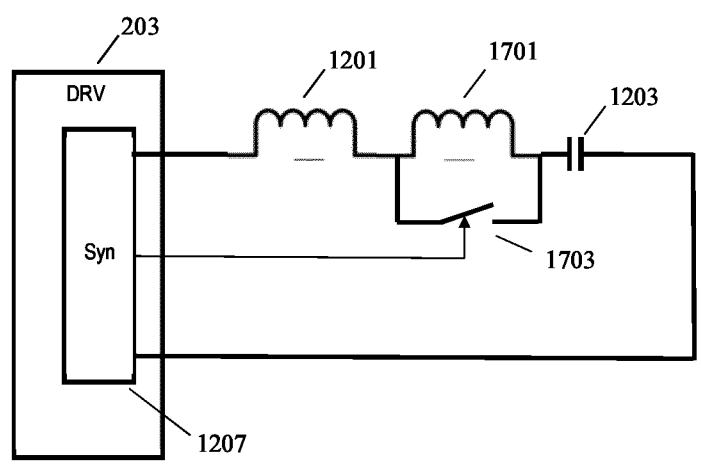
FIG. 17 illustrates an example of elements of a power transmitter in accordance with some embodiments of the invention.

The corresponding example for the inductor 1201 is shown in FIG. 17. In this example, a current reducing inductor 1701 is inserted in series with the inductor 1201 and the switch 1703 is coupled in parallel with the current reducing inductor 1701. In this example, the switch 1703 is open during the fractional time interval resulting in the effective inductance being increased. Accordingly, the current change through the inductor is reduced (as the voltage that the capacitor 1203 imposes is now divided over the inductors 1201 and 1701 and so the resulting voltage that the capacitor 1203 imposes on the inductor 1201 is reduced) during the fractional time interval. At the end of the fractional time interval, the switch 1703 is closed thereby short circuiting the current reducing inductor 1701.

In the following, the operation of the system will be described further with reference to a system wherein the driver 203 comprises a switching bridge/inverter for generating the drive signal. The switching bridge may specifically be a half-bridge or a full-bridge corresponding to the examples of FIGS. 3 and 4.

In the example, the driver 203 furthermore generates the timing signal to have transitions that directly control the fractional time interval. Specifically, the signal is generated to have transitions occurring at times corresponding (and typically being substantially identical, say within $\frac{1}{50}^{th}$ of a cycle time) to the start time of the fractional time interval, at times corresponding (and typically being substantially identical, say within $\frac{1}{50}^{th}$ of a cycle time) to the end time of the fractional time interval, or both at times corresponding (and typically being substantially identical, say within $\frac{1}{50}^{th}$ of a cycle time) to the start time and end time of the fractional time interval.

Furthermore, in the examples, the driver 203 is arranged to synchronize the timing signal to one (or more) of the switch signals controlling the switches of the switch bridge. Thus, as the drive signal is generated by the switching of the switches in the switch bridge, the synchronization of the timing signal, and thus of the fractional time intervals, to the switch signal also provides a synchronization to the drive signal.

Figure 18:
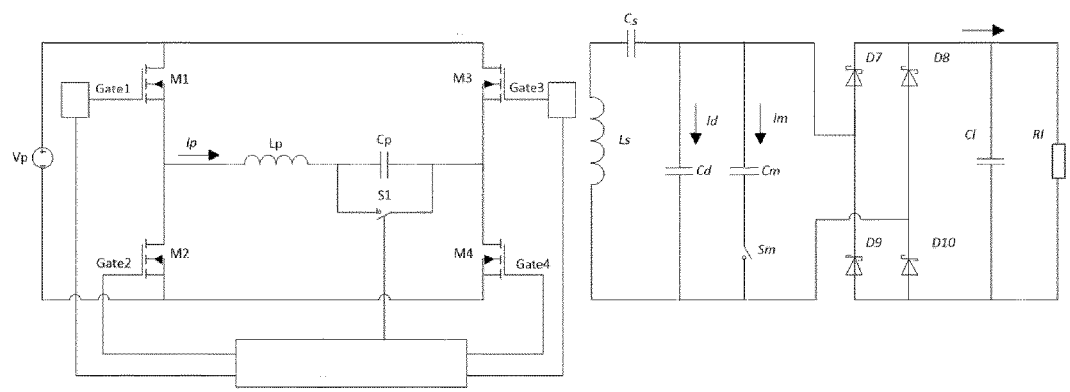
FIG. 18 illustrates an example of elements of a power transmitter in accordance with some embodiments of the invention.

FIG. 18 shows an example of an electrical model of elements of an example of the inductive power transfer system of FIGS. 1 and 2.

The primary resonance circuit 201 is represented by the components $C_p$, and $L_p$, (corresponding to the capacitor 1203 and the inductor 1201). The driver is represented by $V_p$ and the switch bridge formed by switches M1-M4 which in the specific example are FETs. The secondary resonance circuit 205 is represented by the components $C_s$, $L_s$. The capacitor $C_d$ creates a resonance at 1 MHz, which enables power transmitters that use a moveable coil to locate the power receiver (e.g. in accordance with the principles described in the Qi Wireless Power Specification (version 1.0)). The capacitor $C_m$ and switch $S_m$ represent load modulation by the power receiver 105. Diodes $D_7$ to $D_{10}$ and $C_m$ and $R_1$ represent the load of the power receiver 105 (with the diodes providing rectification).

Figure 19:
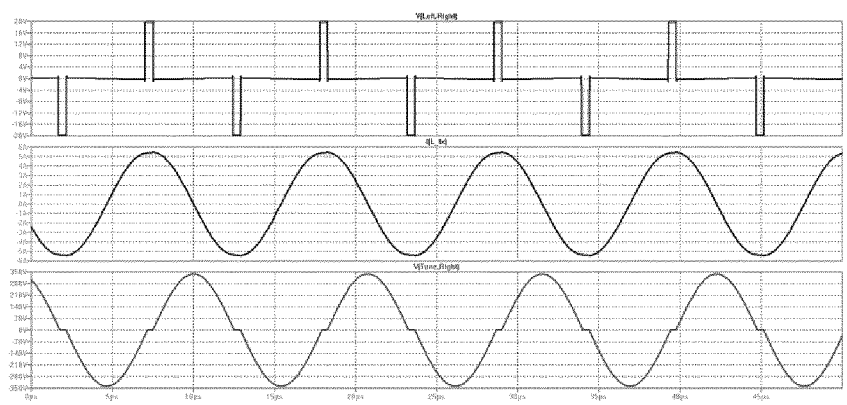
FIG. 19 illustrates examples of signals of a power transmitter in accordance with some embodiments of the invention.

In the example, when switch S1 is opened and closed with an appropriate duty cycle the effective capacitance becomes larger than the capacitance of the capacitor 1203 ($C_p$) on its own. If the effective resonance frequency of the power transmitter is desired to be lower than the natural resonance frequency, then switch S1 is closed for a short period of time just after the voltage across $C_p$ passes zero voltage from negative to positive and/or vice versa. This is illustrated in FIG. 19 which first shows the drive signal and the timing signal controlling the switch S, then the current through the inductor 1201, and finally the voltage across the capacitor (corresponding to FIG. 14). The drive signal is applied to the resonant circuit with a frequency $f_o$ and duty cycle D of 93 kHz and 10% respectively, i.e. the drive signal has an operating frequency of 93 kHz. In the example, the natural resonance frequency $f_n$ of the resonant tank is 100 kHz. Accordingly, the voltage across the resonance circuit (denoted V(left, right)) should for a free running resonance circuit lag the current $i_p(t)$, meaning that it is in capacitive mode operation. However, in the system of FIG. 18, the switch S1 short circuits the capacitor $C_p$ such that the first harmonic of the voltage V(left, right) and the current $i_p$ (t) are in phase, meaning that the power transmitter operates in resonance. Thus, this resonance is achieved by prohibiting the voltage across capacitor $C_p$ from increasing (or decreasing) just after the event of a zero crossing of the voltage $V(C_p)$ by closing switch S1 with an appropriate duty cycle. This effectively diverts the current from the inductor away from the capacitor $C_p$.

Figure 20:
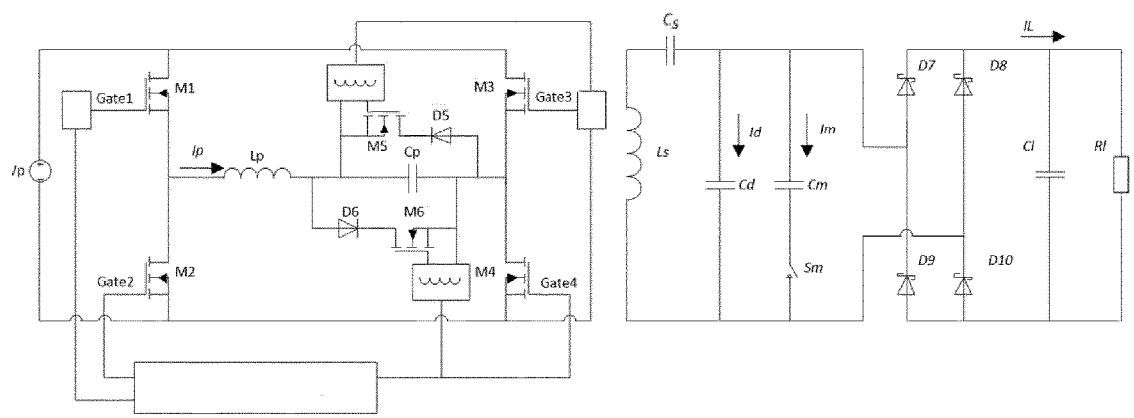
FIG. 20 illustrates an example of elements of a power transmitter in accordance with some embodiments of the invention.

An example of an approach which in many embodiments will be more practical than the example of FIG. 18 is provided in FIG. 20. In the example, of FIG. 20, a simplification of the timing of FIG. 18 is achieved which may provide additional flexibility.

In the example of FIG. 20, the switch is replaced by two current diversion paths with one providing a short circuit for current flowing in one direction, and one for current flowing in the other direction. In the example, each current diversion path includes a rectifier (specifically a diode) which ensures that the current can only flow in one direction for that path.

In this example, the positive current through the resonant tank is now shunted by D6/M6 and the negative current is shunted by D5/M5. Diodes D5 and D6 prevent the body diodes of M5 and M6 from conducting. Switch/FET M6 is controlled by exactly the same signal as Switch/FET M4, i.e. in the example the switch signal for controlling the timing of the fractional time interval is exactly the same as the switch signal for one of the switches of the switch bridge. Indeed, at least one of the begin and end times of the fractional time interval is not only synchronized with, but also coincides with a switching of one of the switches of the switching bridge generating the drive signal.

Indeed, when switch M4 is conducting, the voltage $V(C_p)$ is resonating from negative to positive. When this voltage becomes positive, diode D6 starts conducting immediately because switch M6 is already in the on-state. In this way, the current through $i_p$ (t), commutates naturally from capacitor $C_p$ towards D6/M6 without the need for complex timing control. This is further illustrated in FIG. 21.

A similar situation occurs for the second path of M5/D5. Indeed, in this example, the control switch signal for the switch M5 is directly generated to coincide with the switching of M3.

In the example, each of the current diverting paths (D5/M5 and D6/M6) accordingly comprises both a switch and a rectifier. This allows a more flexible timing of the fractional time interval.

Specifically, the use of both a switch and a rectifier allows the power transmitter to align one of the start time and the end time of the fractional time intervals to the transitions in the timing signals whereas the other is automatically generated by the rectifier, i.e. it is determined by the rectifier switching between a conductive and non-conductive state.

In the example of FIG. 20, the switch may be switched into a conductive state during the time when the voltage of the capacitor is negative. However, due to the diode D6, the current diversion path of D6/M6 does not conduct any current and thus does not divert any (negative or positive) current from the capacitor 1203. Thus, the exact timing of the switching on of the switch M6 is irrelevant, as this does not constitute the beginning of a fractional time interval in which current is diverted away.

However, shortly after a zero crossing of the voltage across the capacitor 1203, the diode D6 will begin to conduct (as soon as the voltage is sufficiently high to provide sufficient forward bias). Thus, when the diode D6 switches from the non-conductive to the conductive state, the current diversion path begins to divert current from the inductor 1201 away from the capacitor 1203. Thus, the start of the fractional time interval is controlled by the diode switching from the non-conductive to the conductive state and is not dependent on when the switch M6 switches. Thus, the start time of the fractional time interval may not be aligned to the timing signal.

The current diversion path will continue to divert current until the switch M6 is switched to the open state (as long as there is current flowing from the inductor in the forward direction of diode D6). Thus, the end time of the fractional time interval is aligned with the transitions of the timing signal, and thus with the transitions of the switch signal for switch M4.

Figure 21:
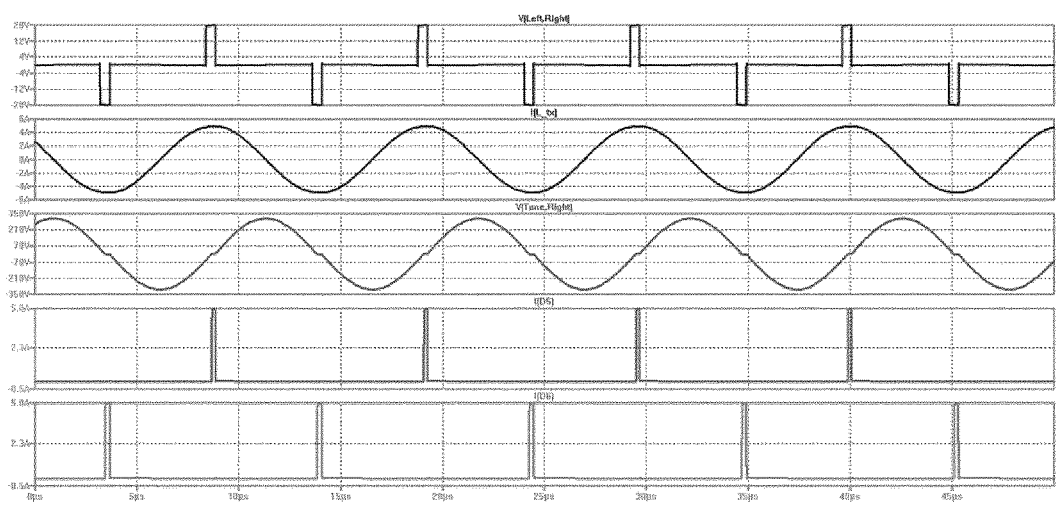
FIG. 21 illustrates examples of signals of a power transmitter in accordance with some embodiments of the invention.

Accordingly, in the example of FIG. 20, and as illustrated by FIG. 21, the power transmitter is arranged to align the start time of the fractional time intervals to the rectifier (diode D6) switching from a non-conductive to a conductive state whereas the end time is aligned to the transitions in the timing signal, and thus to the transitions in the switch signal. Indeed, the same switch signal may be used both for the switch of the current diversion path and for the switch of the switch bridge.

It will be appreciated that in other embodiments, the same principles may e.g. be applied to control the end of the fractional time interval in response to a rectifier switching conductive state, including potentially ending the fractional time interval when a rectifier switches from the conductive to the non-conductive state. Such implementations may e.g. be useful when blocking of current to the inductor is employed, e.g. instead of diverting current from the capacitor.

The approach has a number of particular advantages. Indeed, it allows for an automatic synchronization of the start of the fractional time intervals to zero crossings of the capacitor voltage and/or of the inductor current. Thus, it automatically aligns the start of the fractional time interval to times when the components may easily be short circuited or disconnected, thereby allowing a lower complexity embodiment.

Another significant advantage is that it provides additional flexibility in generating the drive signal and the switch signal for the switch bridge. Specifically, as the fractional time intervals are only synchronized to one edge of the switch signals, the other can (within reason) be freely varied. This specifically allows the duty cycle to be varied and thus allows the driver to dynamically vary the power level of the generated power transfer signal without changing e.g. the operating frequency or the amplitude level of the signal.

Indeed, the approach allows for a much simplified generation of the drive signal. Specifically, instead of switching on the corresponding switches of the switch bridge (M1/M4 and M2/M3 respectively) only during the relatively short time interval in which drive signal is active (i.e. as in the first curve of FIG. 21), all of the switches can be operated by substantially square wave signals with a duty cycle of 50%. The duty cycle of the drive signal may then be generated by the relative phase difference between these drive signals. However, as only one of the edges controls the timing of the fractional time intervals, this does not affect the fractional time interval.

Furthermore, the approach still ensures that the first power receiver 105 and the operating frequency are inherently locked together with the same value. Specifically, this results from the fact that the oscillations of the resonance circuit 201 are effectively restarted for every cycle of the drive signal.

It should be noted that in the example of FIG. 20, the voltage levels in the system typically requires that the switches controlling the fractional time interval (i.e. switch M5 and M6) are driven through high voltage level shifters, which is typically implemented using two extra pulse transformers.

Figure 22:
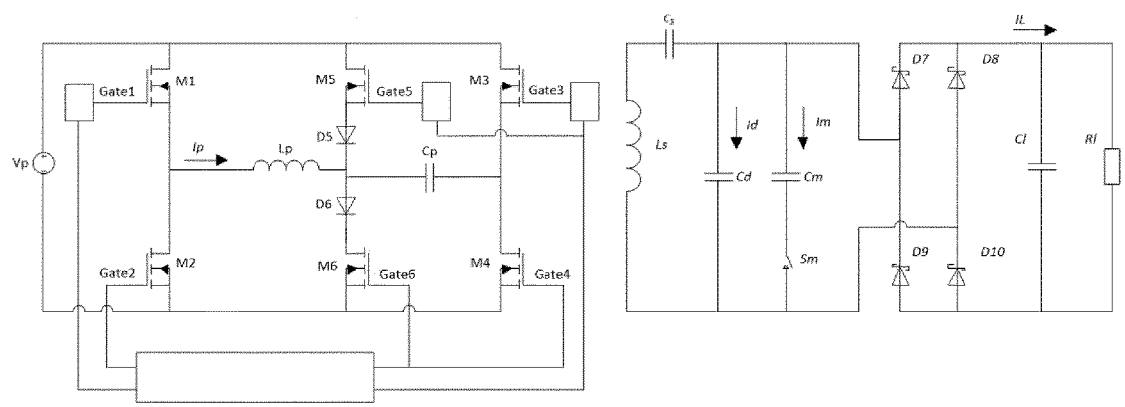
FIG. 22 illustrates an example of elements of a power transmitter in accordance with some embodiments of the invention.

However, this may be partly avoided in the system of FIG. 22 (specifically the high voltage level shifter can be avoided for switch M6). In this example, two current diversion paths are coupled between the junction point of the inductor 1201 and the capacitor 1203 and the power rails for the power supply to the switching bridge.

The operation of the system of FIG. 22 is similar to the example of FIG. 20 and simply provides a different path back to the power supply for the current being diverted. However, an important difference is that switches M5 and M6 are referenced to respectively the voltage rail and ground for the inverter, i.e. to fixed voltages. This may substantially facilitate driving of the switches, e.g. when these are implemented as MOSFETs. In the example, switch M6 can be implemented by a MOSFET being driven directly by the same switch signal as M4. However, a MOSFET implementing M5 would still require a pulse transformer as the voltage of the source of this MOSFET will have negative voltage values.

Figure 23:
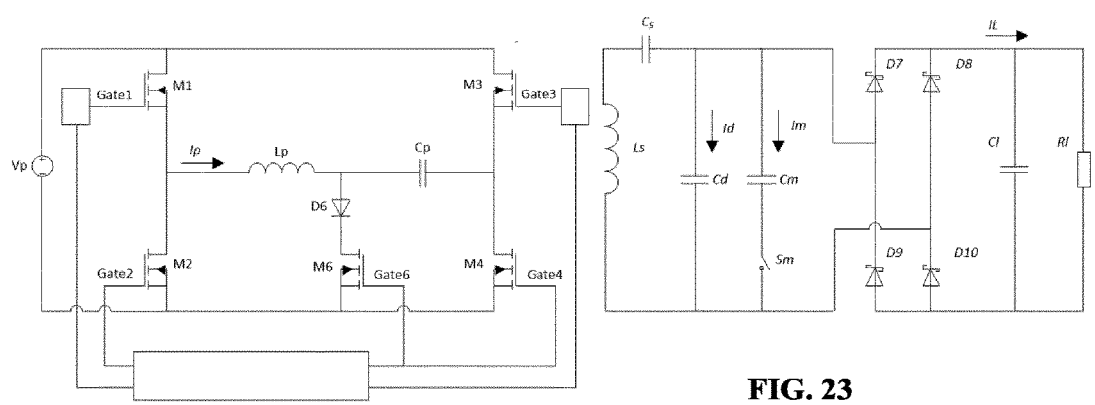
FIG. 23 illustrates an example of elements of a power transmitter in accordance with some embodiments of the invention.

FIG. 23 illustrates a modification of the system of FIG. 22. In this example, the current diversion path to the voltage rail, i.e. the current diversion path comprising D5/M5 have been completely removed. Although this system introduces fractional time intervals only for half of the zero crossings (i.e. only one zero crossing per cycle), it has been found to provide an effective adjustment of the effective resonance frequency.

Thus, in the system of FIG. 23, a current diversion path comprises a switch and rectifier coupled in a series configuration and with one end of the current diversion path being coupled to the junction point between the inductor and capacitor and the other end of the current diversion path being coupled to the ground supply rail for the switching bridge. In the system, and rectifier aligns the start times of the fractional time intervals to the time when the rectifier switches from a non-conductive to a conductive state, whereas the end times of the fractional time interval are aligned to the switching of switch M4 of the switching bridge.

The approach allows for a very low complexity approach for adapting the resonance frequency of a power transmitter such that it matches the drive signal. The approach can specifically provide an automatic system wherein the frequency of the drive signal is always the same as the resonance frequency of the primary resonance circuit, and vice versa.

Figure 24:
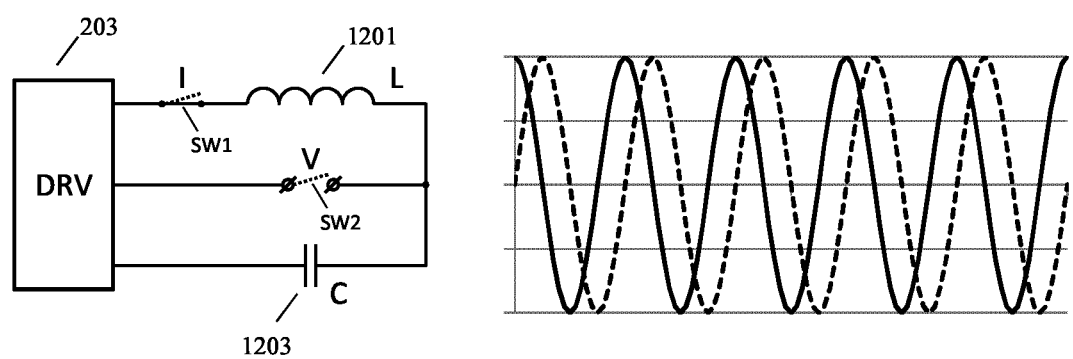
FIG. 24 illustrates an example of elements of a power transmitter in accordance with some embodiments of the invention.

To illustrate the locking of the operating frequency and the primary resonance frequency, the system of FIG. 24 may be considered. The example illustrates the driver 203 driving the resonant circuit comprising the inductor 1201 (L) and the capacitor 1203 (C). If the driver applies a step voltage to the resonant circuit, it starts to oscillate at the well-known resonance frequency $f=1/2\pi\sqrt{LC}$. These oscillations are visible in the current I(drawn line) running through the system, and the voltage V (dashed line) at the junction between the inductor 1201 and the capacitor 1203. In the presence of damping, the oscillations die out after some time, leading to a steady state in which the capacitor 1203 is charged to the step voltage of the driver 203. In practice, the resonant circuit has a high Q factor, i.e. low damping, which means that the oscillations continue for many periods of the resonant frequency.

If the driver 203 applies a signal at a frequency that is equal to the resonance frequency, the oscillations can be sustained indefinitely, even in the presence of damping. In this case, the very high currents can run through the circuit. However, if the driver 203 applies a signal at a frequency that is different from the resonance frequency, the system will not "swing" very well, resulting in much lower current running through the circuit. In fact, in the latter case, the current and voltage signals in the circuit will contain two frequencies, namely the driving frequency and the resonance frequency, where the resonance frequency will be more pronounced with a higher Q factor of the resonant tank circuit. The two frequencies in the current and voltage signals lead to a beat frequency on their amplitude—this is sometimes also (incorrectly) referred to as intermodulation between the two frequencies. In a wireless power transfer system, which relies on amplitude modulation—as achieved through load modulation on the power receiving side of the system—this can make reliable communications difficult, if not impossible. It is therefore advantageous, if not essential in certain cases, to operate the system at a frequency that is equal to the resonance frequency.

Figure 25:
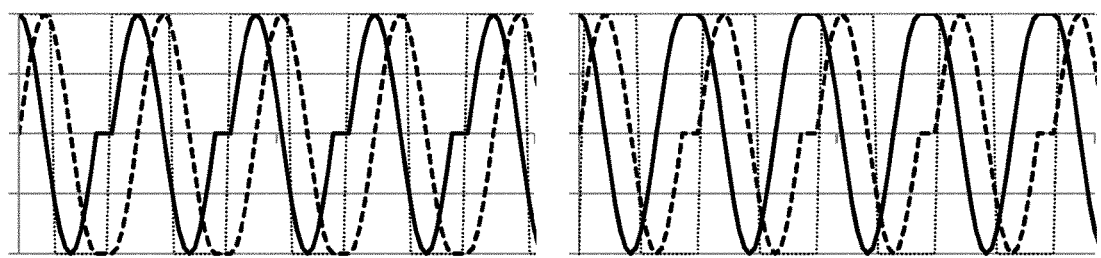
FIG. 25 illustrates examples of signals of a power transmitter in accordance with some embodiments of the invention.

By closing either switch SW1 or SW2 after the completion of a cycle of the oscillations at the resonance frequency, further oscillations at that frequency will be inhibited. In other words, the state of change of the current and voltage signals in the circuit will be slowed down—to zero in this example. Opening the switch again at the start of the next cycle of the driving signal restarts the oscillation at the resonance frequency, as if the driving signal was applied for the first time. This means that the phases of the current signal or voltage signal are reset to match the phase of the driving signal. In other words, the frequency of the cycles in the circuit becomes effectively equal to the driving frequency—but they no longer have a sinusoidal shape. In FIG. 25, the left-hand side shows the resulting waveforms for closing SW1 at a negative-to-positive zero crossing of the current, and the right-hand side figure shows the resulting waveform for closing SW2 at a negative-to-positive zero crossing of the voltage. The drawn waveforms represent the current; the dashed waveforms represent the voltage; and the dotted lines represents the driving signal—in this case a square wave.

It should be noted that depending on the difference between the driving frequency and the resonance frequency, the system may also work to effectively suppress the beats in the current and voltage signals by operating the switch(es) once every few cycles, as opposed to once every cycle. For example, if the driving frequency approaches the resonance frequency, the frequency of the beats increases and the resulting changes in the amplitude take multiple cycles to build up. Resetting the phases every few cycles is in that case sufficient to keep the sensitivity for load-modulation based communications on a sufficient level, while reducing potential losses in the system, which may arise from operating the switch(es).

Synchronizing the operation of the switches can be achieved in many ways such as e.g. described previously for the various different embodiments. Opening the switch is most easily synchronized with an edge—e.g. a rising edge—of a square wave or pulse wave driving signal. For closing the switch, a measurement system can be added to the tank circuit, which triggers on a negative-to-positive zero crossing of the current or voltage signal. Someone skilled in the art will be able to design many kinds of circuits that perform this functionality.

In the case of a wireless power system that comprises a single driver driving multiple tank circuits in parallel, which is an advantageous implementation to achieve greater (lateral) positioning tolerance of the power receiver, it is difficult-if not impossible—to operate the system at the resonance frequency. The reason is that due to natural spread in inductance and capacitance values of the components that are used to implement the wireless power system, each resonant tank circuit typically has a different resonance frequency. By limiting the Q factor of each resonant tank circuit, the current and voltage signal component at the resonance frequency can be kept small relative to the signal component at the drive frequency. This keeps the beats on the amplitude in check, such that communications based on amplitude modulation remain possible. However, a disadvantage of this approach is that a low Q factor requires a relatively high coupling in order to keep the efficiency of the power transfer up to the mark. In other words, the low Q factor does not permit a large distance between the power transmitting and receiving parts of the system.

By inhibiting the free-running oscillations as described above, the beats between the various frequencies in the system—the driving frequency as well as the different resonance frequencies of the multiple resonant tank circuits—can be kept in check, enabling communications by means of amplitude modulation. In other words, it becomes possible to realize a high-Q multi-coil or array-based power transmitter that is able to demodulate amplitude communications from a power receiver that is positioned at a much larger distance.

The description provided above with respect to in particular FIGS. 12-25 thus provides exemplary embodiments of a number of features. Specifically, the following features and concepts may be applied in the specific described examples, or indeed in other circuits using corresponding approaches.

In many embodiments, the frequency modification circuit may be arranged to slow the state change by impeding an energy flow between the inductive impedance and the capacitive impedance during the fractional time interval.

In many embodiments, the frequency modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing any current flow.

In many embodiments, the driver comprises a switching bridge for generating the drive signal; and wherein the driver is arranged to synchronize the transitions of the timing signal to transitions of a switch signal for a switch of the switching bridge.

This may provide improved performance in many scenarios, and may in particular allow a very efficient and practical implementation. A low complexity but accurate control can be achieved in many embodiments.

In many embodiments, the frequency modification circuit comprises a switch and rectifier and the frequency modification circuit is arranged to align one of the start time and the end time to the transitions and to align the other of the start time and the end time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end times in response to different parameters may provide additional flexibility, and in particular may allow more flexibility of controlling parameters of the drive signal, such as specifically the duty cycle.

In many embodiments, the frequency modification circuit is arranged to slow the state change for the capacitive impedance by diverting current from the inductive impedance away from the capacitive impedance during the fractional time intervals.

This may provide a particularly effective performance while allowing facilitated and typically low complexity implementation.

In many embodiments, the frequency modification circuit comprises a current diversion path arranged to divert current from the inductive resonance away from the capacitive impedance, the current diversion path comprising a switch for connecting and disconnecting the current diversion path; and the frequency modification circuit being arranged to align switching of the switch to the timing signal.

This may provide a particularly effective performance while allowing facilitated and typically low complexity implementation.

In many embodiments, the frequency modification circuit comprises a switch and rectifier coupled in a series configuration and the frequency modification circuit is arranged to align one of the start time and the end time to the transitions and to synchronize the other of the start time and the end time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end times in response to different parameters provide additional flexibility and in particular may allow more flexibility of controlling parameters of the drive signal, such as specifically the duty cycle.

In many embodiments, the start time of the fractional time intervals may be aligned to the rectifier switching from a non-conductive to a conductive state, and the end times are controlled by the timing signal.

In many embodiments, a first end of the current diversion path is coupled to a junction point between the inductive impedance and the capacitive impedance.

This may provide a particularly advantageous implementation which allows effective yet facilitated operation. In many embodiments, the approach may reduce the complexity of the frequency modification circuit, such as specifically the number of dedicated components required.

In many embodiments, a second end of the current diversion path is coupled to a voltage supply rail.

This may provide a particularly advantageous implementation which allows effective yet facilitated operation. In many embodiments, the approach may reduce the complexity of the frequency modification circuit, such as specifically the number of dedicated components required. In many embodiments, it may facilitate the driving of the switch for connecting and disconnecting the current diversion path.

In many embodiments, the driver comprises a switching bridge generating the drive signal; and the driver is arranged to synchronize the transitions of the timing signal to coincide with transitions of a switch signal for a switch of the switching bridge.

This may provide improved performance and/or simplified implementation. The synchronization may specifically time align the transitions of the timing signal to those of the switch signal, say e.g. within $1/50^{th}$ of period time for the drive signal.

In many embodiments, the current diversion path comprises a switch and rectifier coupled in a series configuration, a first end of the current diversion path is coupled to a junction point between the inductive impedance and the capacitive impedance and a second end of the current diversion path is coupled to a ground supply rail for the switching bridge, and the power transmitter is arranged to align start times of the fractional time interval to a time of the rectifier switching from a non-conductive to a conductive state and to align end times of the fractional time interval to a switching of a switch of the switching bridge.

This may provide particularly advantageous performance and/or implementation.

In many embodiments, the frequency modification circuit is arranged to slow the state change for the inductive impedance by impeding current flow from the capacitive impedance to the inductive impedance during the fractional time interval.

This may provide a particularly effective performance while allowing facilitated and typically low complexity implementation.

In many embodiments, the frequency modification circuit is arranged to slow the state change for the inductive impedance by blocking current flow from the capacitive impedance to the inductive impedance during the fractional time interval.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for wirelessly providing power to a power receiver using an inductive power signal; the power transmitter comprising:
    a variable resonance circuit for generating the inductive power signal in response to a drive signal, the variable resonance circuit having a resonance frequency being a variable resonance frequency;
    a driver for generating the drive signal for the variable resonance circuit, the drive signal having an operating frequency;
    a load modulation receiver for demodulating load modulation of the inductive power signal by the power receiver and for generating a demodulation quality measure; and
    an adaptor for adapting the operating frequency and the resonance frequency to converge, the adaptation of the operating frequency and the resonance frequency further being in response to the demodulation quality measure.

2. The power transmitter of claim 1 wherein the demodulation quality measure comprises a modulation depth measure reflecting a difference measure for measurements of at least one of a current and a voltage of the variable resonance circuit for different modulation loads of the inductive power transfer.

3. The power transmitter of claim 1 wherein the demodulation quality measure comprises a data demodulation error rate.

4. The power transmitter of claim 3 wherein the adaptor is arranged to change the operating frequency and the resonance frequency in response to a detection of the data demodulation error rate exceeding a threshold.

5. The power transmitter of claim 1 wherein the adaptor is further arranged to determine a power transfer property being a property of a power transfer to the power receiver, and the adaptor is arranged to adapt the operating frequency and the resonance frequency in response to the power transfer property.

6. The power transmitter of claim 5 wherein the power transfer property reflects at least one of a power level for the power signal and a power transfer efficiency measure.

7. The power transmitter of claim 5 further comprising a power controller for adapting a duty cycle of the drive signal in response to a power request received from the power receiver.

8. The power transmitter of claim 1 wherein the adaptor is arranged to adapt the operating frequency and the resonance frequency to deviate from a maximum power transfer efficiency frequency.

9. The power transmitter of claim 1 wherein the adaptor is arranged to adapt the resonance frequency and the operating frequency in response to an intermodulation measure indicative of an intermodulation between the resonance frequency and the operating frequency.

10. The power transmitter of claim 1 wherein the adaptor is arranged to perform a joint adaptation of the operating frequency and the resonance frequency in response to the demodulation quality measure, the joint adaptation maintaining a fixed relationship between the operating frequency and the resonance frequency.

11. The power transmitter of claim 1 wherein the adaptor is arranged to adapt the resonance frequency and the operating frequency to be substantially equal.

12. The power transmitter of claim 1 wherein the power transmitter is arranged to determine the demodulation quality measure in response to a comparison of measured load modulation and expected load modulation for a reference data pattern.

13. The power transmitter of claim 1 wherein the resonance circuit comprises a capacitive impedance and an inductive impedance; the power transmitter further comprises a frequency modification circuit for controlling the resonance frequency by slowing a state change for at least one of the capacitive impedance and the inductive impedance for a fractional time interval of at least some cycles of the drive signal, the frequency modification circuit being arranged to align at least one of a start time and an end time for the fractional time interval to transitions of a timing signal; and the driver is arranged to generate the timing signal to have transitions synchronized to the drive signal.

14. The power transmitter of claim 13 wherein the frequency modification circuit comprises a switch and rectifier and the frequency modification circuit is arranged to align one of the start time and the end time to the transitions and to align the other of the start time and the end time to the rectifier switching between a non-conductive and a conductive state.

15. A method of operation for a power transmitter for wirelessly providing power to a power receiver using an inductive power signal, the power transmitter comprising a variable resonance circuit for generating the inductive power signal in response to a drive signal, the variable resonance circuit having a resonance frequency being a variable resonance frequency; the method comprising:
    generating the drive signal for the variable resonance circuit, the drive signal having an operating frequency;
    demodulating load modulation of the inductive power signal by the power receiver;
    generating a demodulation quality measure; and
    adapting the operating frequency and the resonance frequency to converge, the adaptation of the operating frequency and the resonance frequency further being in response to the demodulation quality measure.

16. A wireless power transfer system including a power receiver and a power transmitter for wirelessly providing power to the power receiver using an inductive power signal; the power transmitter comprising:

a variable resonance circuit for generating the inductive power signal in response to a drive signal, the variable resonance circuit having a resonance frequency being a variable resonance frequency;

a driver for generating the drive signal for the variable resonance circuit, the drive signal having an operating frequency;

a load modulation receiver for demodulating load modulation of the inductive power signal by the power receiver and for generating a demodulation quality measure; and an adaptor for adapting the operating frequency and the resonance frequency to converge, the adaptation of the operating frequency and the resonance frequency further being in response to a demodulation quality measure.

17. The wireless power transfer system of claim 16 wherein the power transmitter further comprises a transmitter for transmitting an indication of a reference data pattern to the power receiver, the power receiver is arranged to load modulate the power signal with the reference data pattern indicated by the indication of the reference data pattern, and the power transmitter is arranged to determine the demodulation quality measure in response to a comparison of measured load modulation and expected load modulation for the reference data pattern.

18. The wireless power transfer system of claim 16 wherein the power receiver is arranged to load modulate the power signal with a reference data pattern, and the power transmitter is arranged to determine the demodulation quality measure in response to a comparison of measured load modulation and expected load modulation for the reference data pattern, the power receiver being arranged to determine a timing for load modulating the power signal by the reference data pattern relative to a timing signal received from the power transmitter.

* * * * *